(12) United States Patent
Deliz Centeno

(10) Patent No.: US 12,260,145 B1
(45) Date of Patent: Mar. 25, 2025

(54) TRANSFER OF THE DISPLAY OF CONTENT BETWEEN DEVICES WITH ANIMATION

(71) Applicant: Apple Inc., Cupertino, CA (US)

(72) Inventor: Luis R. Deliz Centeno, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/243,959

(22) Filed: Sep. 8, 2023

Related U.S. Application Data

(60) Provisional application No. 63/405,118, filed on Sep. 9, 2022.

(51) Int. Cl.
| | |
|---|---|
| *G06F 3/14* | (2006.01) |
| *G06F 3/01* | (2006.01) |
| *G06F 3/0481* | (2022.01) |
| *G06F 3/0484* | (2022.01) |
| *G06T 13/00* | (2011.01) |

(52) U.S. Cl.
CPC ............ *G06F 3/1423* (2013.01); *G06F 3/013* (2013.01); *G06F 3/0481* (2013.01); *G06F 3/0484* (2013.01); *G06T 13/00* (2013.01)

(58) Field of Classification Search
CPC ...... G06F 3/1423; G06F 3/013; G06F 3/0481; G06F 3/0484; G06T 1/00
See application file for complete search history.

(56) References Cited

U.S. PATENT DOCUMENTS

| | | | |
|---|---|---|---|
| 2015/0062164 A1* | 3/2015 | Kobayashi | G06T 11/60 |
| | | | 345/633 |
| 2016/0259611 A1* | 9/2016 | Park | G06F 3/1431 |
| 2017/0365097 A1* | 12/2017 | Lim | G06F 3/04817 |
| 2019/0025815 A1* | 1/2019 | Saadoun | G06F 3/0383 |
| 2020/0042274 A1 | 2/2020 | Park et al. | |
| 2021/0405862 A1* | 12/2021 | Datwani | G06F 3/0488 |
| 2022/0113929 A1 | 4/2022 | Yu | |

* cited by examiner

*Primary Examiner* — Lisa S Landis
(74) *Attorney, Agent, or Firm* — Fernando & Partners, LLP

(57) ABSTRACT

In one implementation, a method of transferring the display of video content from a first location to a second location is performed at a first device including an image sensor, a first display, one or more processors, and non-transitory memory. The method includes detecting a second device in a field-of-view of the image sensor displaying video content at a first location in the physical environment on a second display. The method includes detecting a transfer trigger to display the video content at a second location in the physical environment. The method includes, in response to detecting the transfer trigger, displaying, on the first display, a transfer animation of the video content being moved from the first location to the second location.

21 Claims, 26 Drawing Sheets

300

At a first device, in a physical environment, including an image sensor, a first display, one or more processors, and non-transitory memory:

Detecting a second device in a field-of-view of the image sensor displaying video content at a first location in the physical environment on a second display ⌇310

Detecting a transfer trigger to display the video content at a second location in the physical environment ⌇320

In response to detecting the transfer trigger, displaying, on the first display, a transfer animation of the video content being moved from the first location to the second location ⌇330

Figure 3

TRANSFER OF THE DISPLAY OF CONTENT BETWEEN DEVICES WITH ANIMATION

CROSS-REFERENCE TO RELATED APPLICATIONS

This application claims priority to U.S. Provisional Patent App. No. 63/405,118, filed on Sep. 9, 2022, which is hereby incorporated by reference in its entirety.

TECHNICAL FIELD

The present disclosure generally relates to transferring the display of content between devices including an animation.

BACKGROUND

While consuming content on a device, a user may wish to transition the display of content to another device. However, such transition can introduce delay and/or cause portions of the content to be skipped.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flowchart representation of a method of transferring the display of video content from a first location to a second location.

Figure 1:
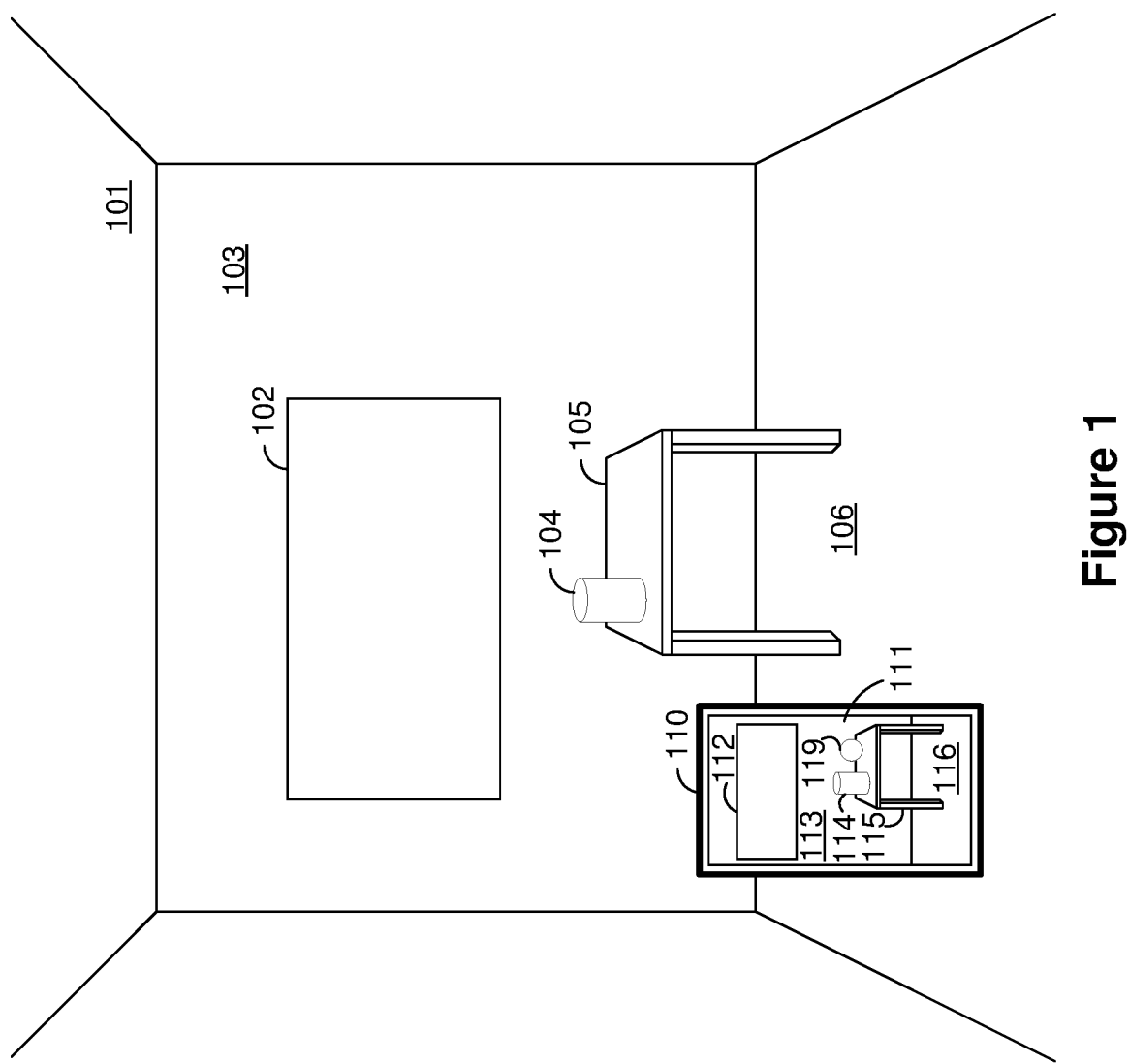
FIG. 1 illustrates a physical environment with an electronic device surveying the physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for transferring the display of video content from a first location to a second location. In various implementations, the method is performed at a first device including an image sensor, a first display, one or more processors, and non-transitory memory. The method includes detecting a second device in a field-of-view of the image sensor displaying video content at a first location in the physical environment on a second display. The method includes detecting a transfer trigger to display the video content at a second location in the physical environment. The method includes, in response to detecting the transfer trigger, displaying, on the first display, a transfer animation of the video content being moved from the first location to the second location.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, a user consuming context using a first device, such as watching a video on a smartphone, may wish to consume the content on a second device with a larger screen, such as by casting the content to a television. However, in various implementations, the content is paused while display of the content is transferred. Further, in various implementations, if the content is not paused, portions of the content (e.g., frames of video content) are not displayed by either device while the content is transferred. Further, in various implementations, even if the content is not paused and each portion of the content is displayed by at least one of the devices, while the gaze of the user transitions between the first device and the second device, the user may not see portions of the content.

Accordingly, in various implementations, while transitioning display of content between a first device at a first location and a second device at a second location, an animation is displayed between the first location and the second location, wherein the animation displays the content. Further, when the content is video content, the animation displays the video content playing at the frame rate of the video content so as to eliminate delays, skipping, or unseen frames during playback of the video content.

In various implementations, the display of content is transitioned between a first device (e.g., a smartphone) and a second device (e.g., a television) and a third device (e.g., an HMD) displays the animation. In various implementations, the display of content is transitioned between a first device (e.g., a smartphone) and a second device (e.g., an HMD) and the second device (e.g., the HMD) displays the animation.

FIG. 1 illustrates a physical environment 101 with an electronic device 110 surveying the physical environment 101 in accordance with some implementations. The physical environment 101 includes a television 102 hanging on a wall 103, a table 105 on a floor 106, and a cylinder 104 on the table 105.

The electronic device 110 presents, on a display, an XR environment including a representation of the physical environment 111 including a representation of the television 112 hanging on a representation of the wall 113, a representation of the table 115 on a representation of the floor 116, and a representation of the cylinder 114 on the representation of the table 115. In various implementations, the representation of the physical environment 111 is generated based on an image of the physical environment captured with a scene camera of the electronic device 110 having a field-of-view directed toward the physical environment 101. In other implementations, the representation of the physical environment is presented through a transparent or translucent display of the electronic device 110. In other words, the physical environment 101 may be directly viewed through the transparent or translucent display of the electronic device 110.

In addition to the representations of real objects of the physical environment 101, the XR environment includes a virtual ball 119 displayed on the representation of the table 115.

Figure 2A:
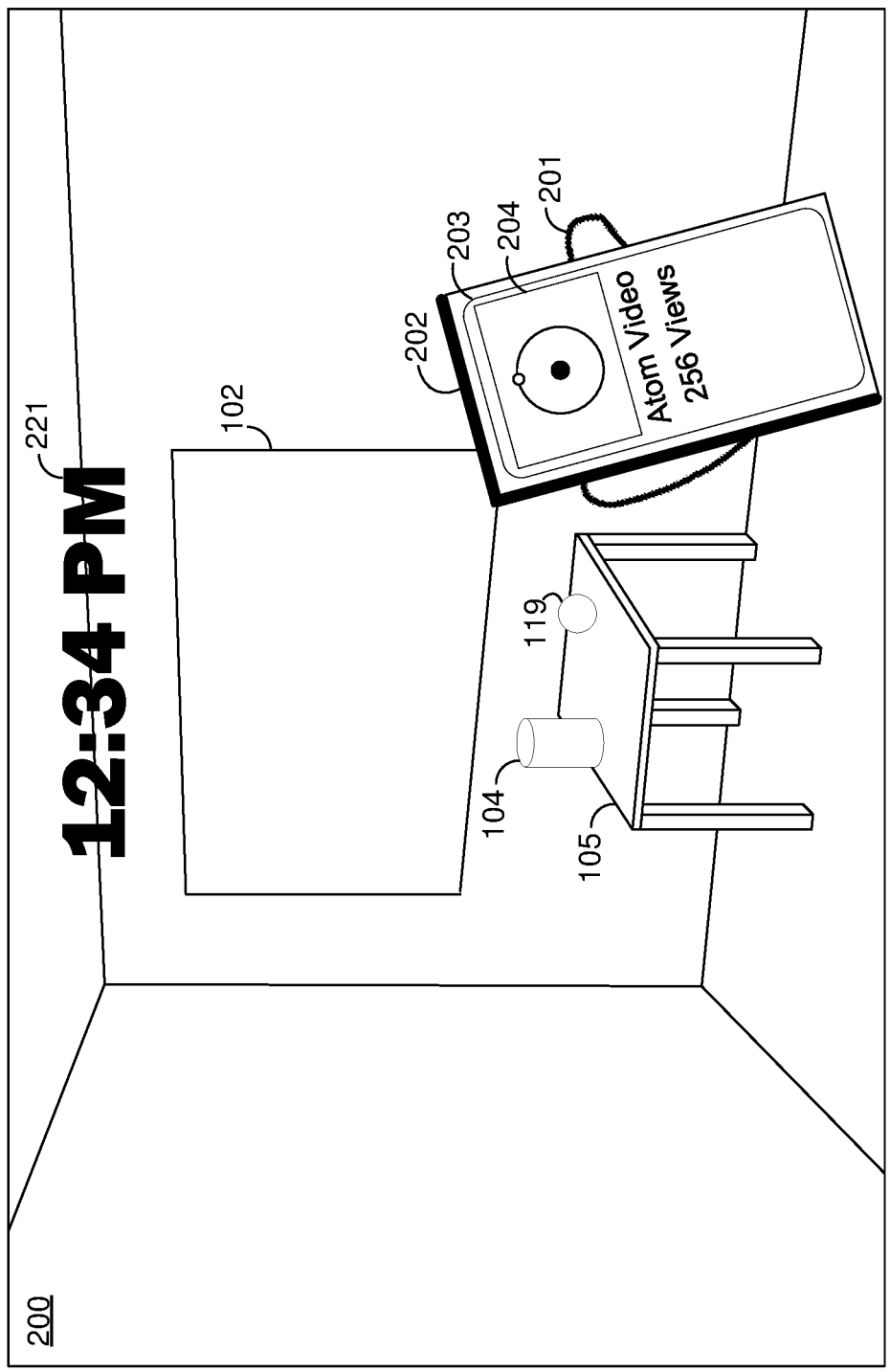
FIGS. 2A-2W illustrate an XR environment at a series of time periods in accordance with some implementations.
Figure 2B:
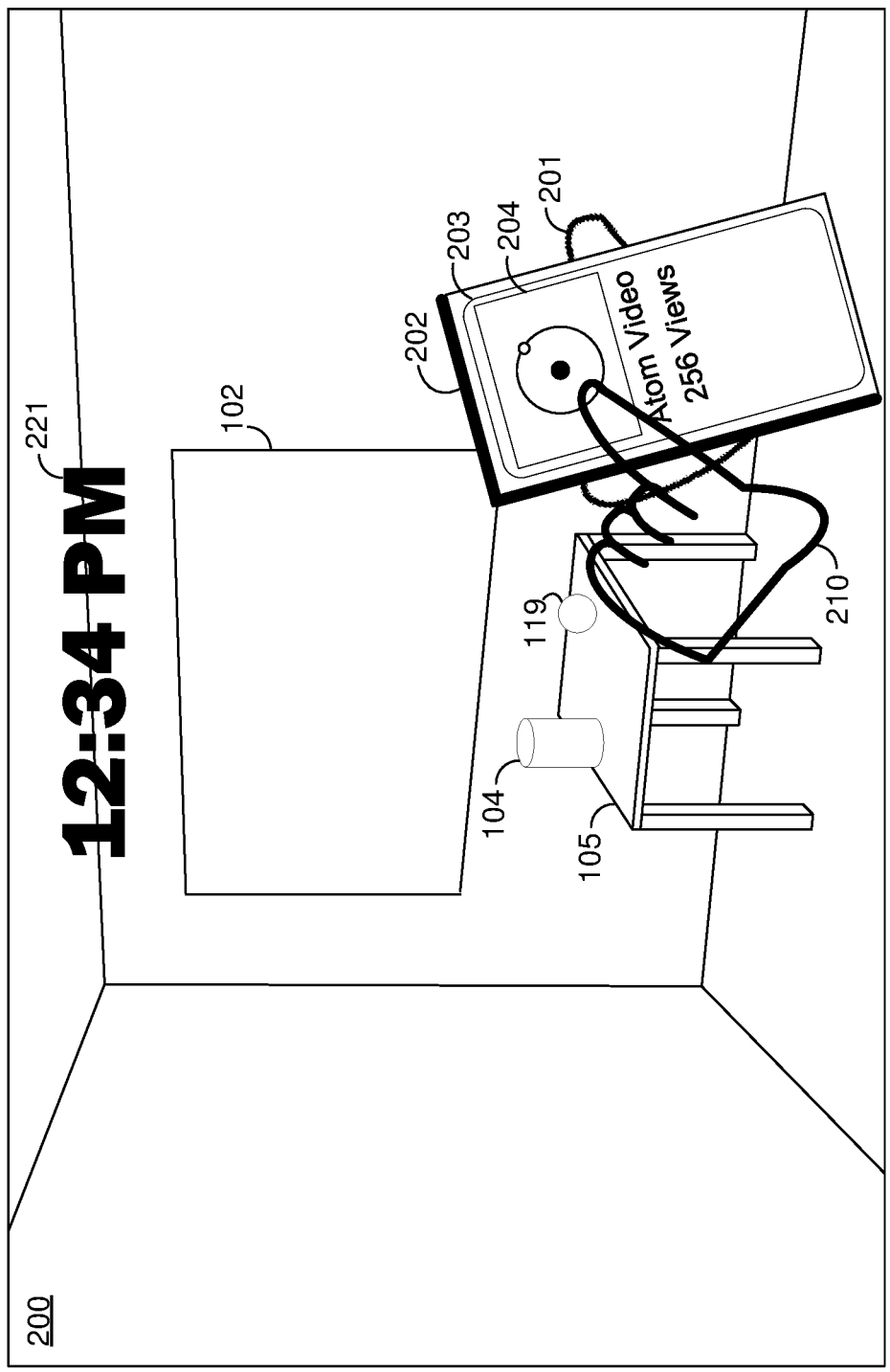
Figure 2C:
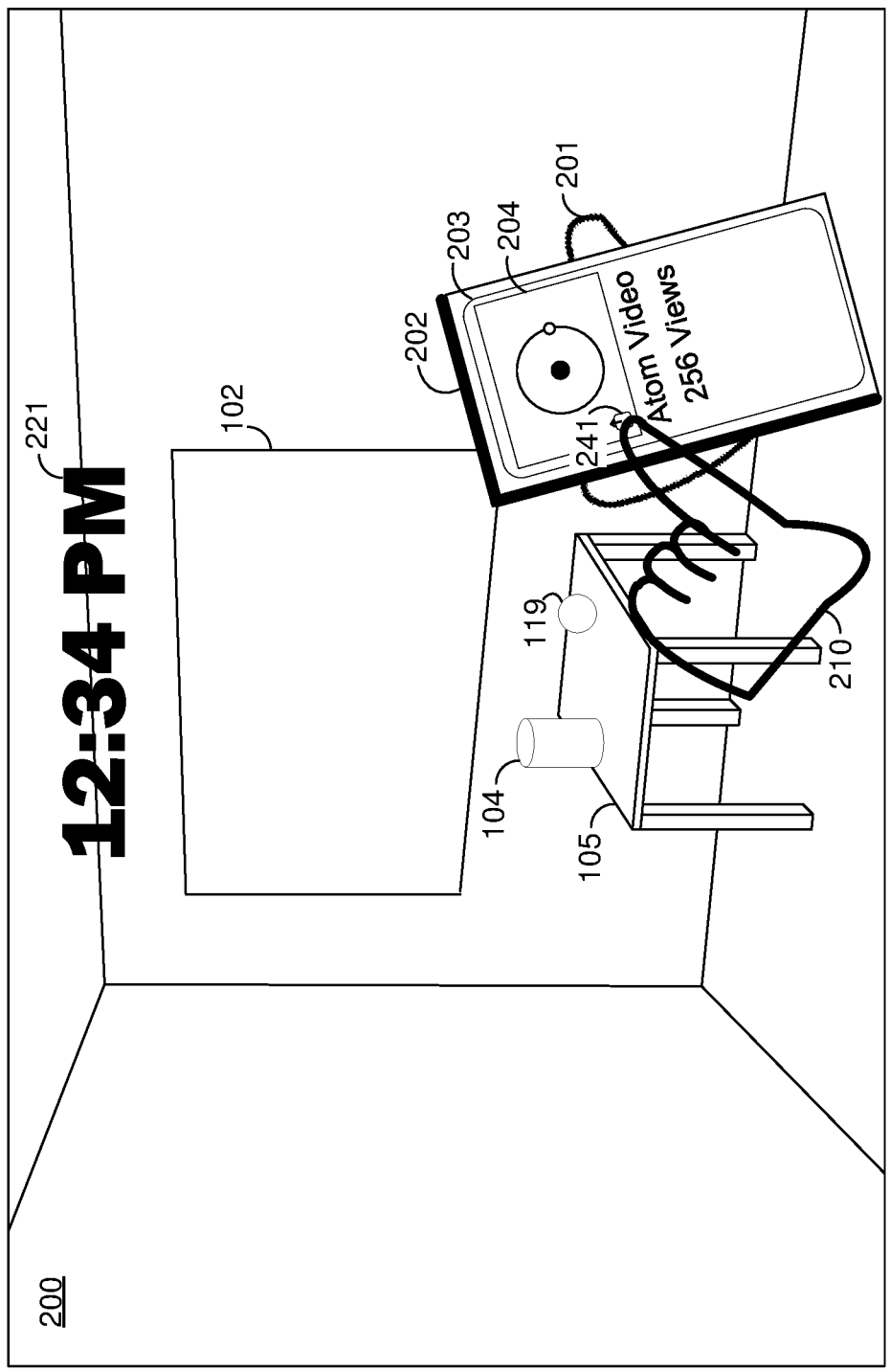
Figure 2D:
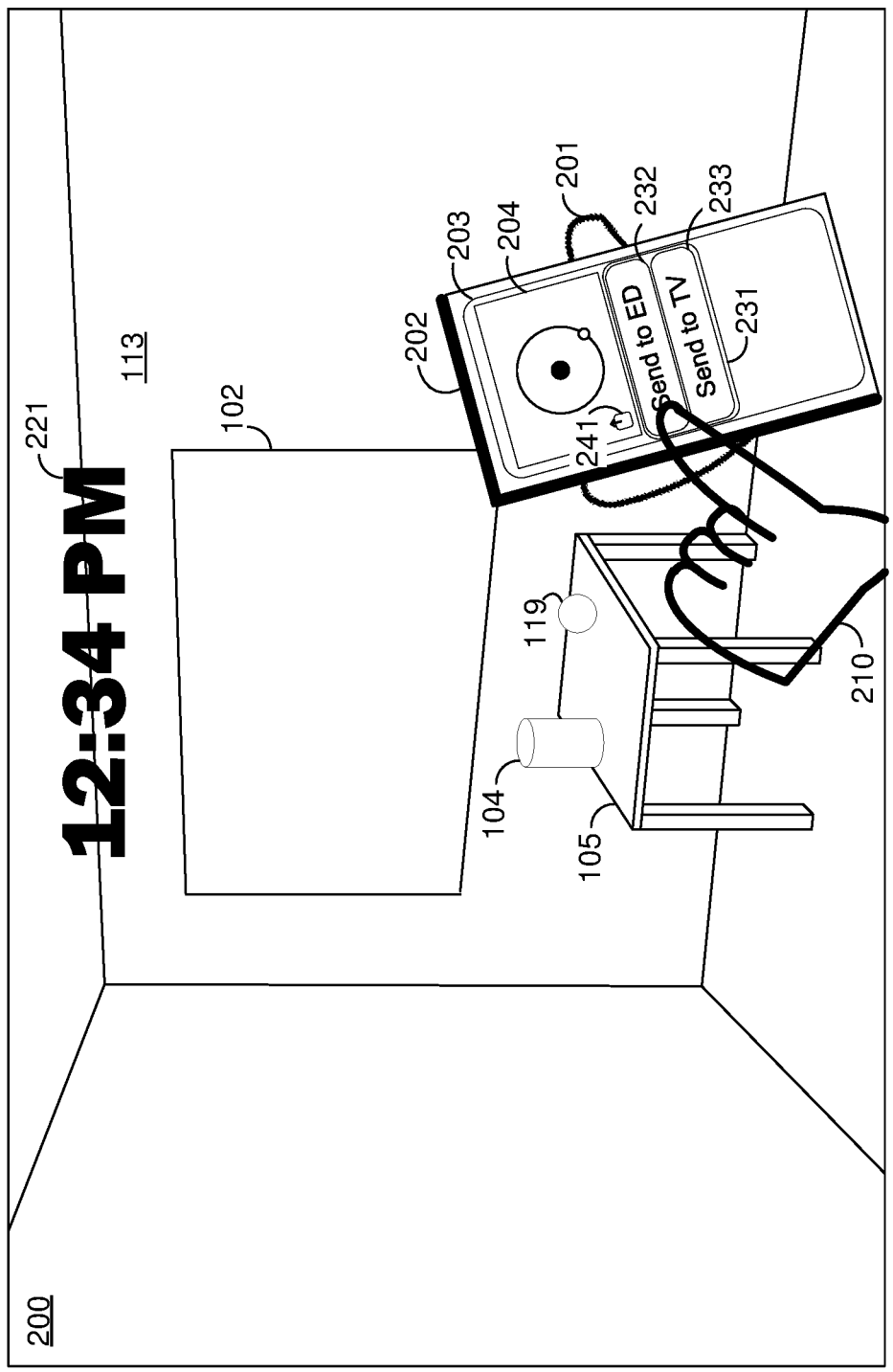
Figure 2E:
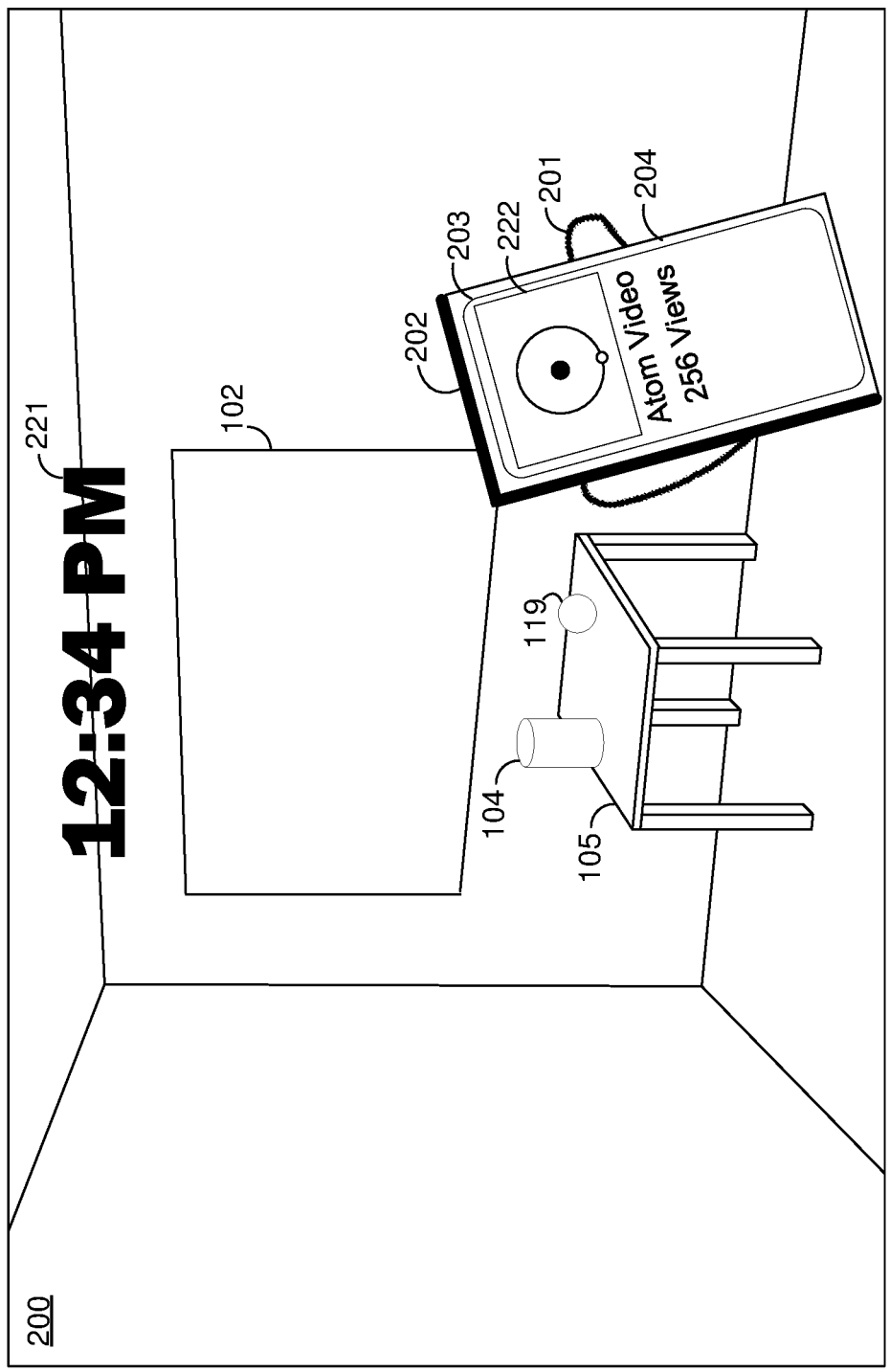
Figure 2F:
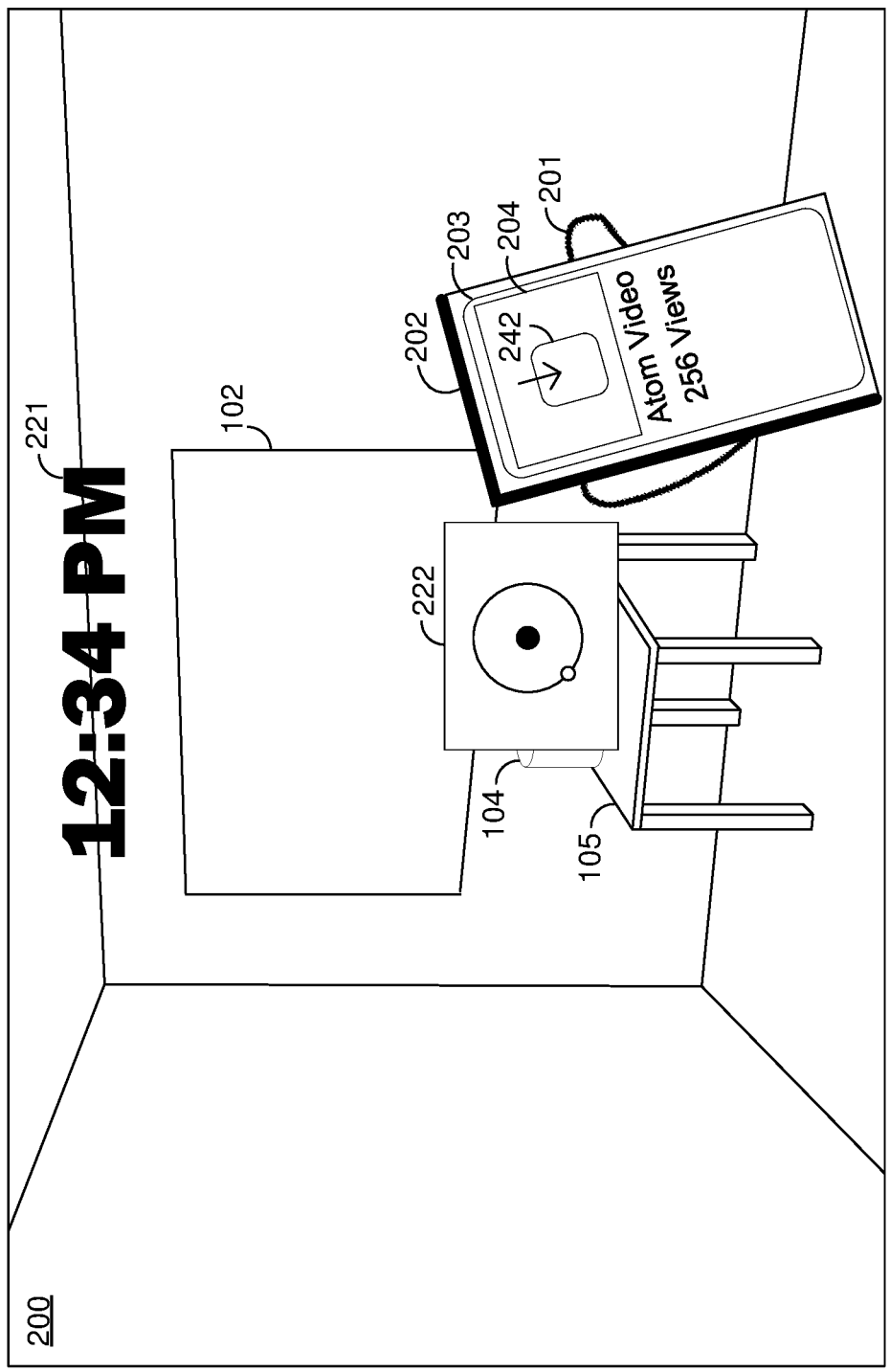
Figure 2G:
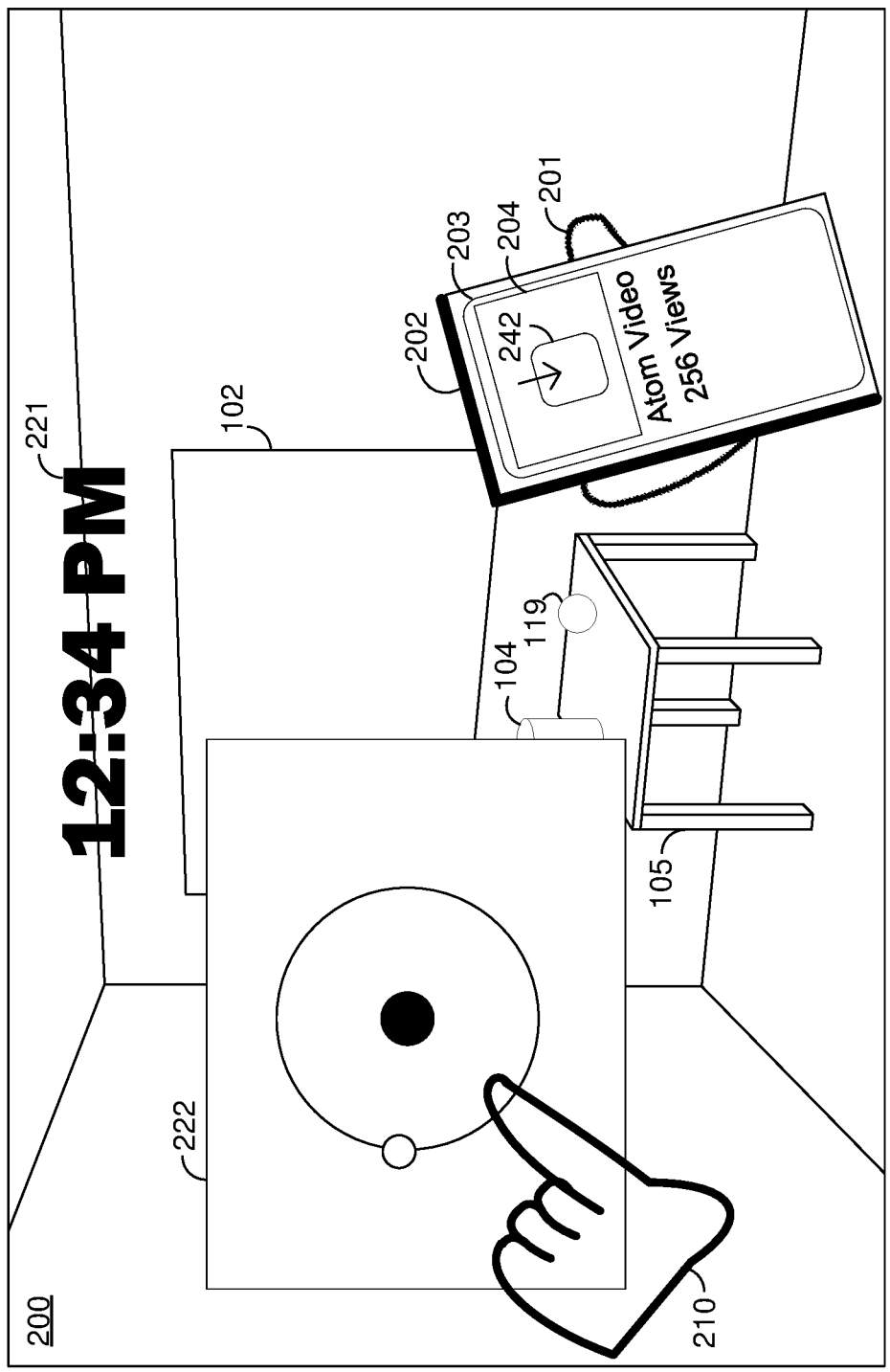
Figure 2H:
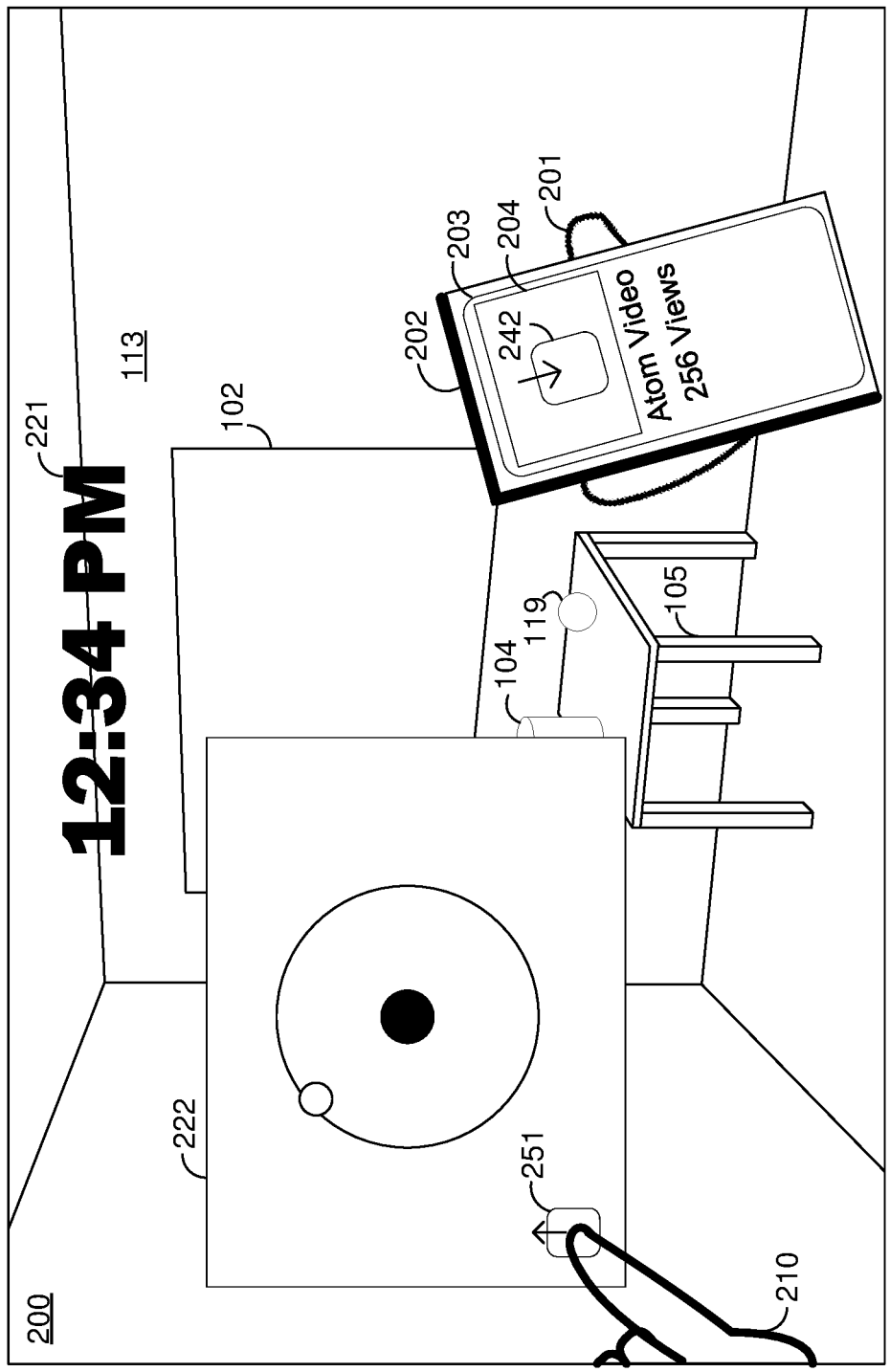
Figure 2I:
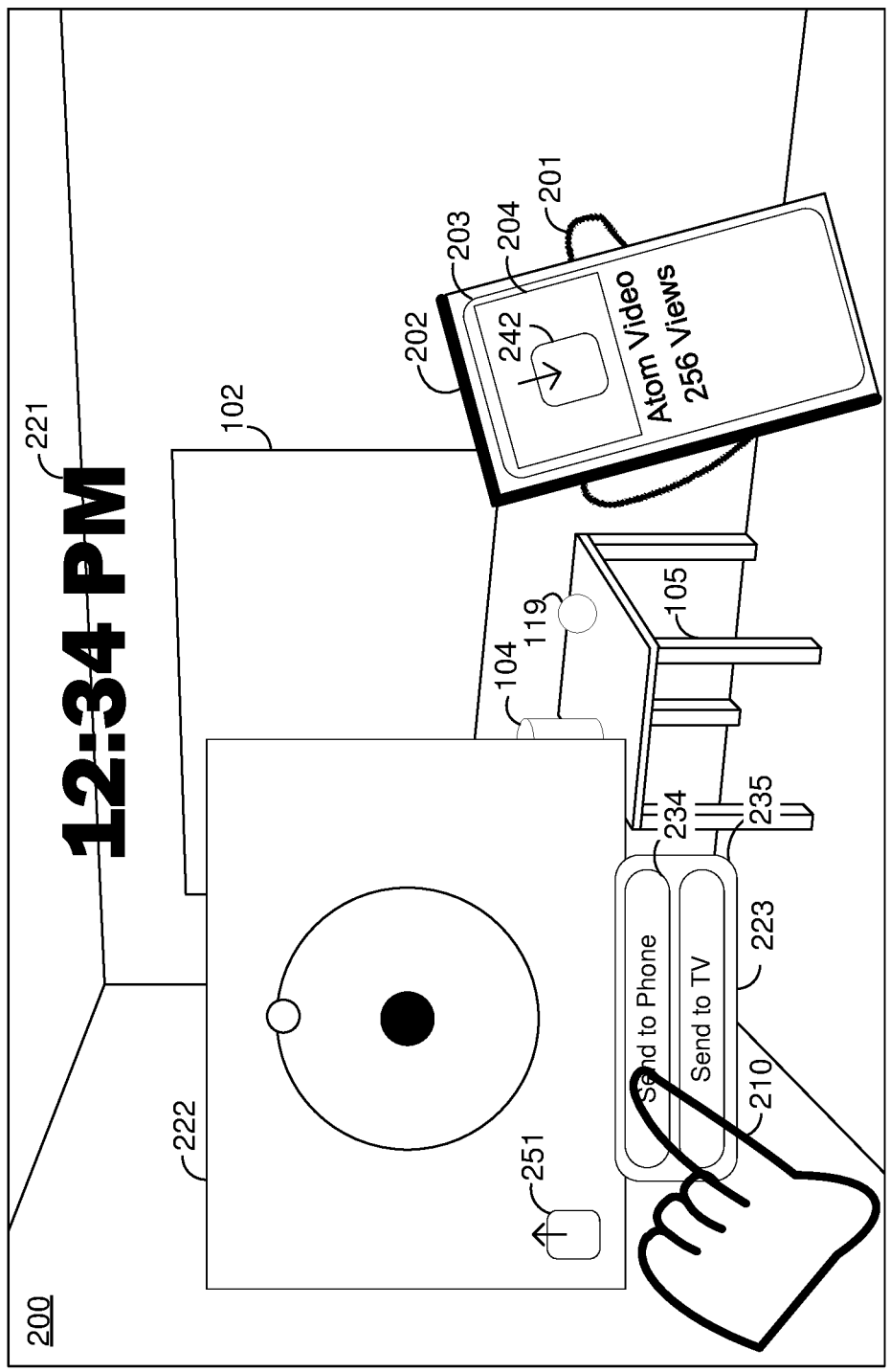
Figure 2J:
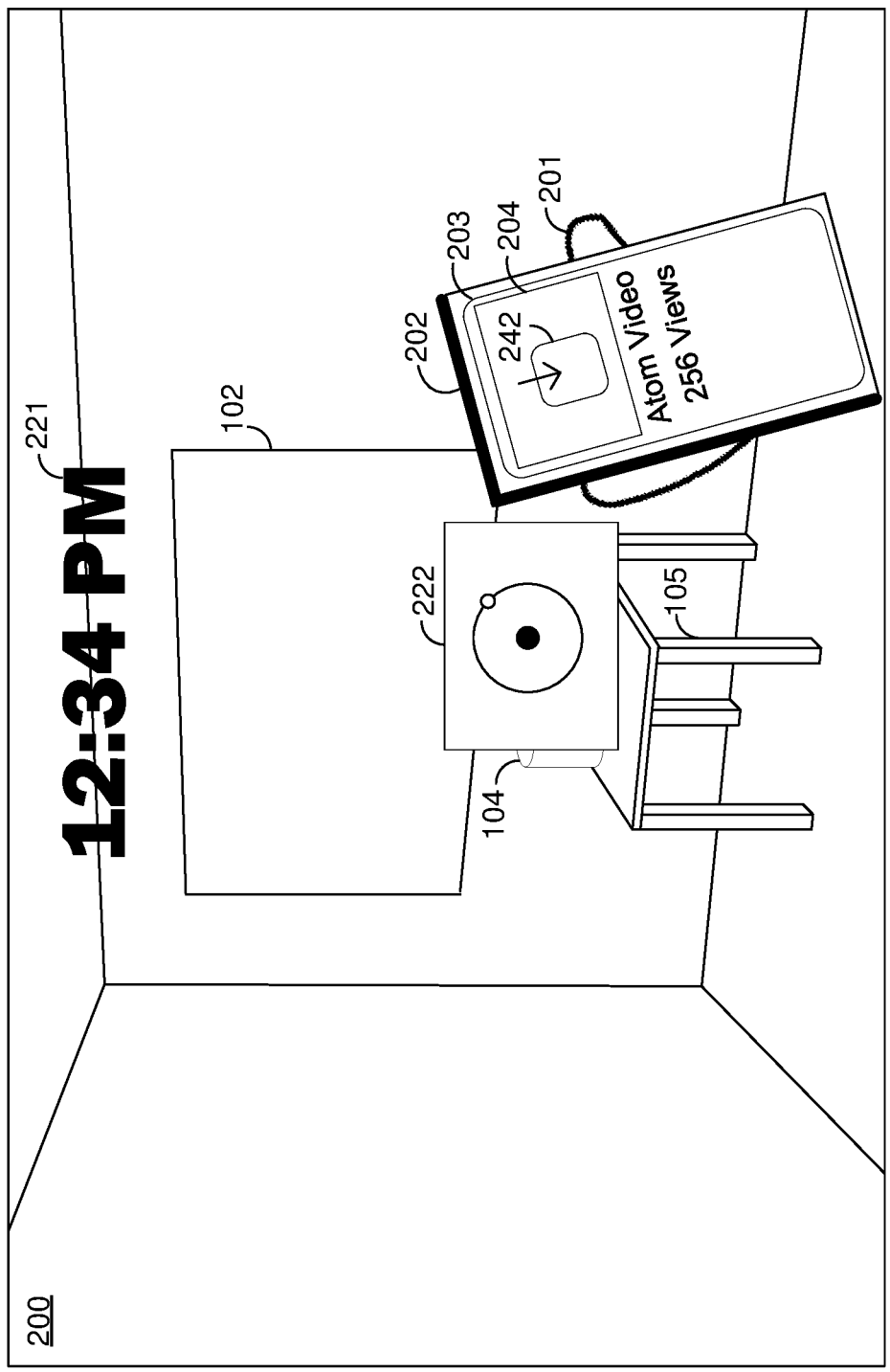
Figure 2K:
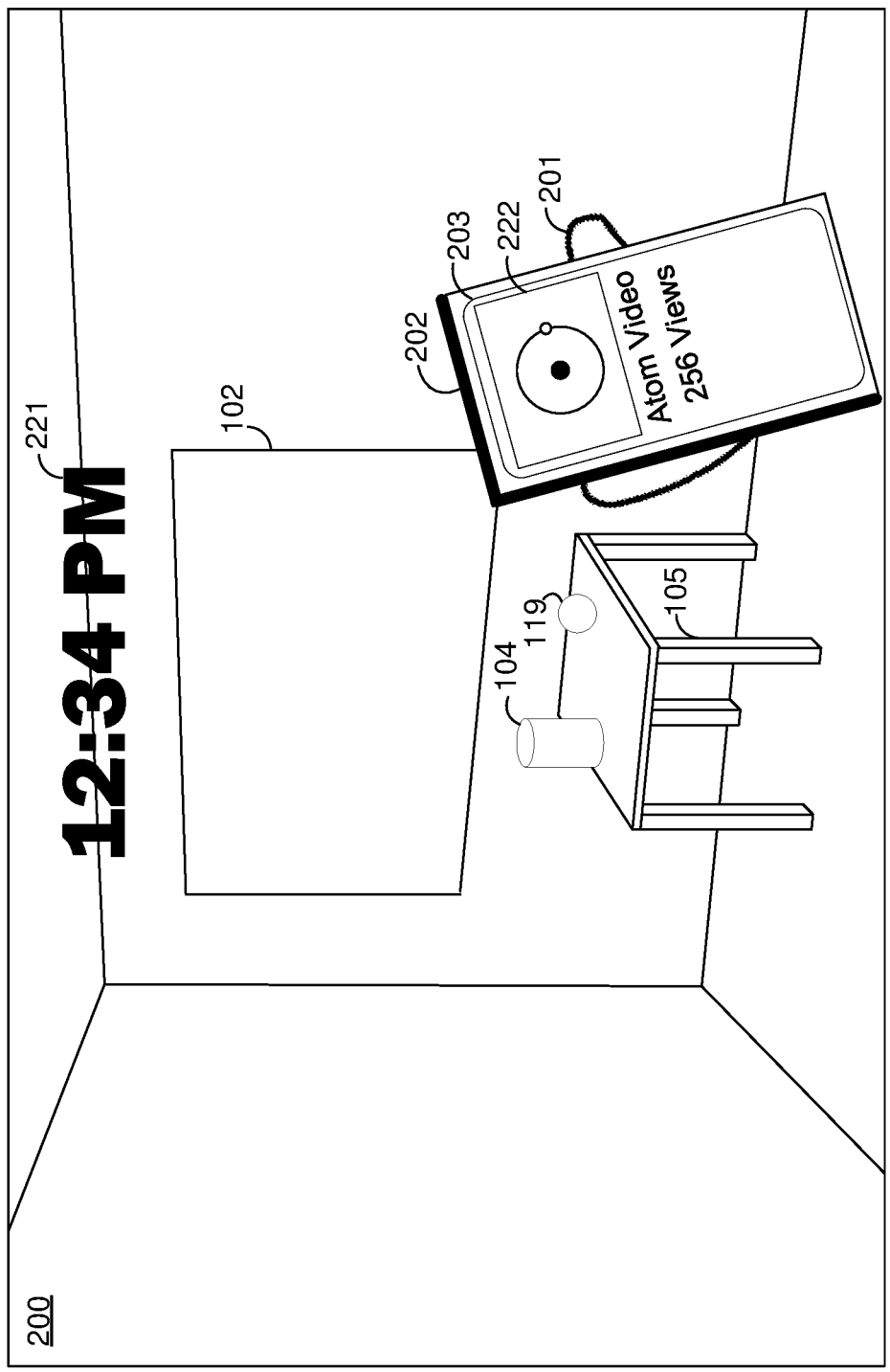
Figure 2L:
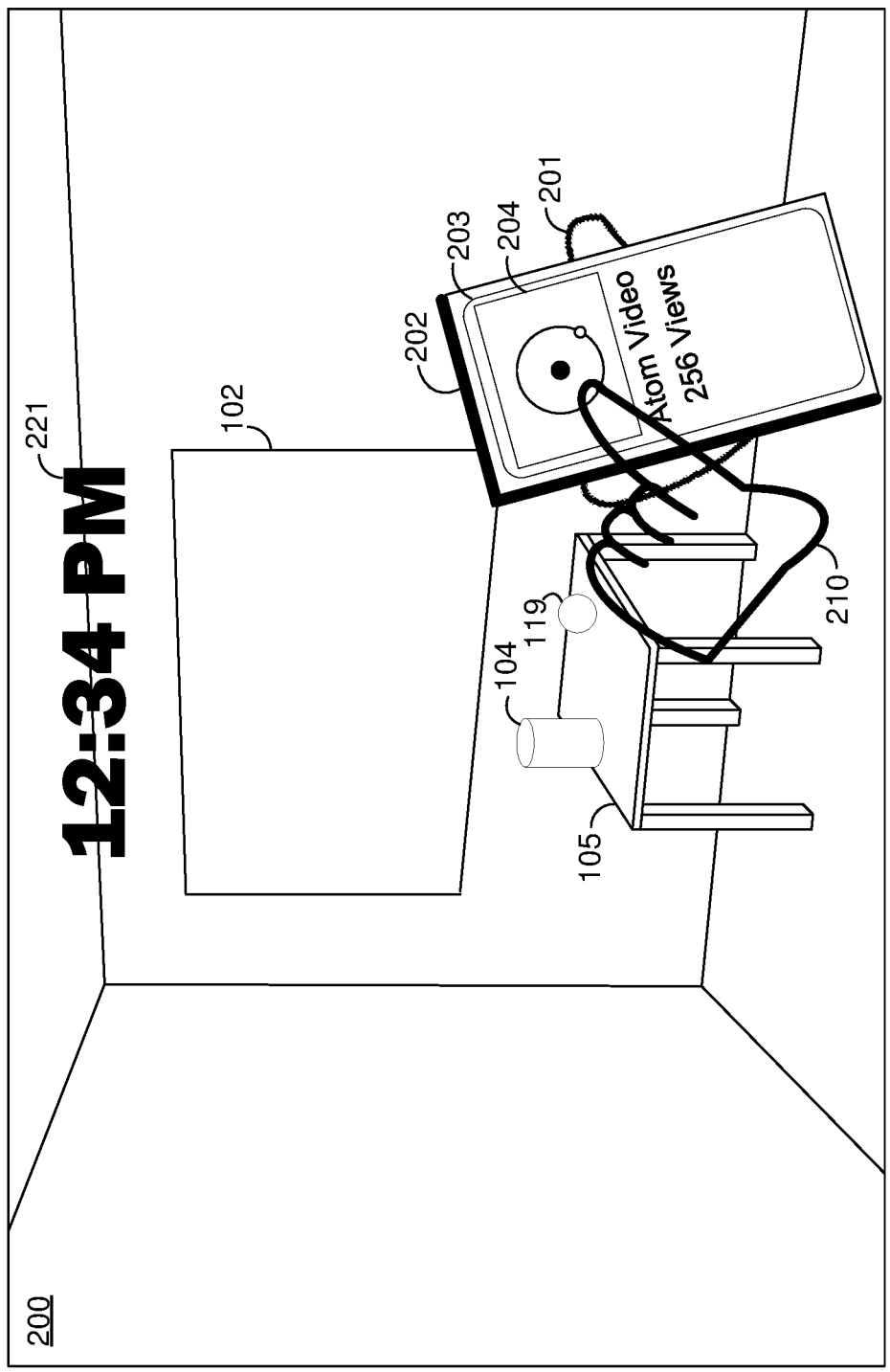
Figure 2M:
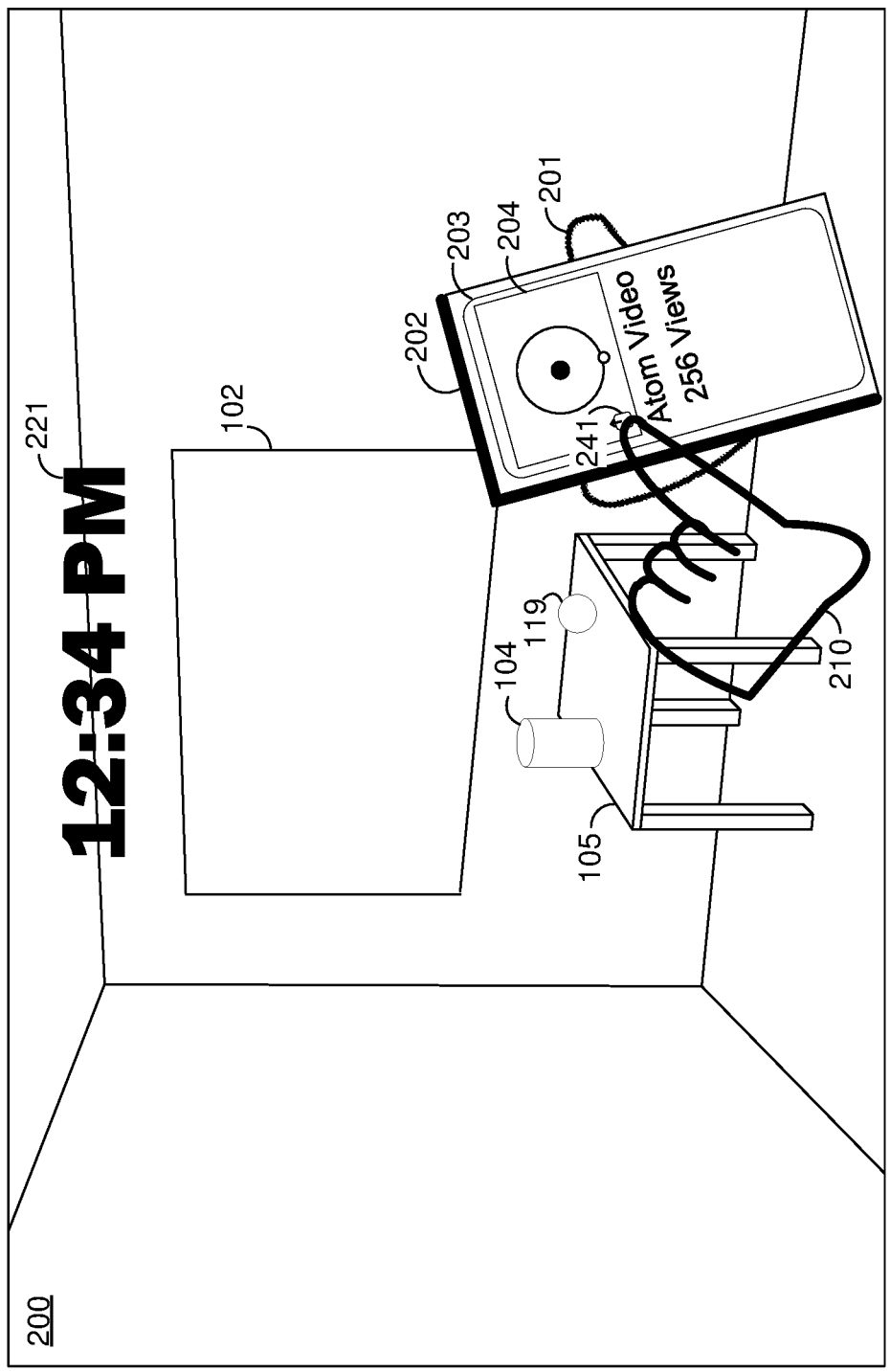
Figure 2N:
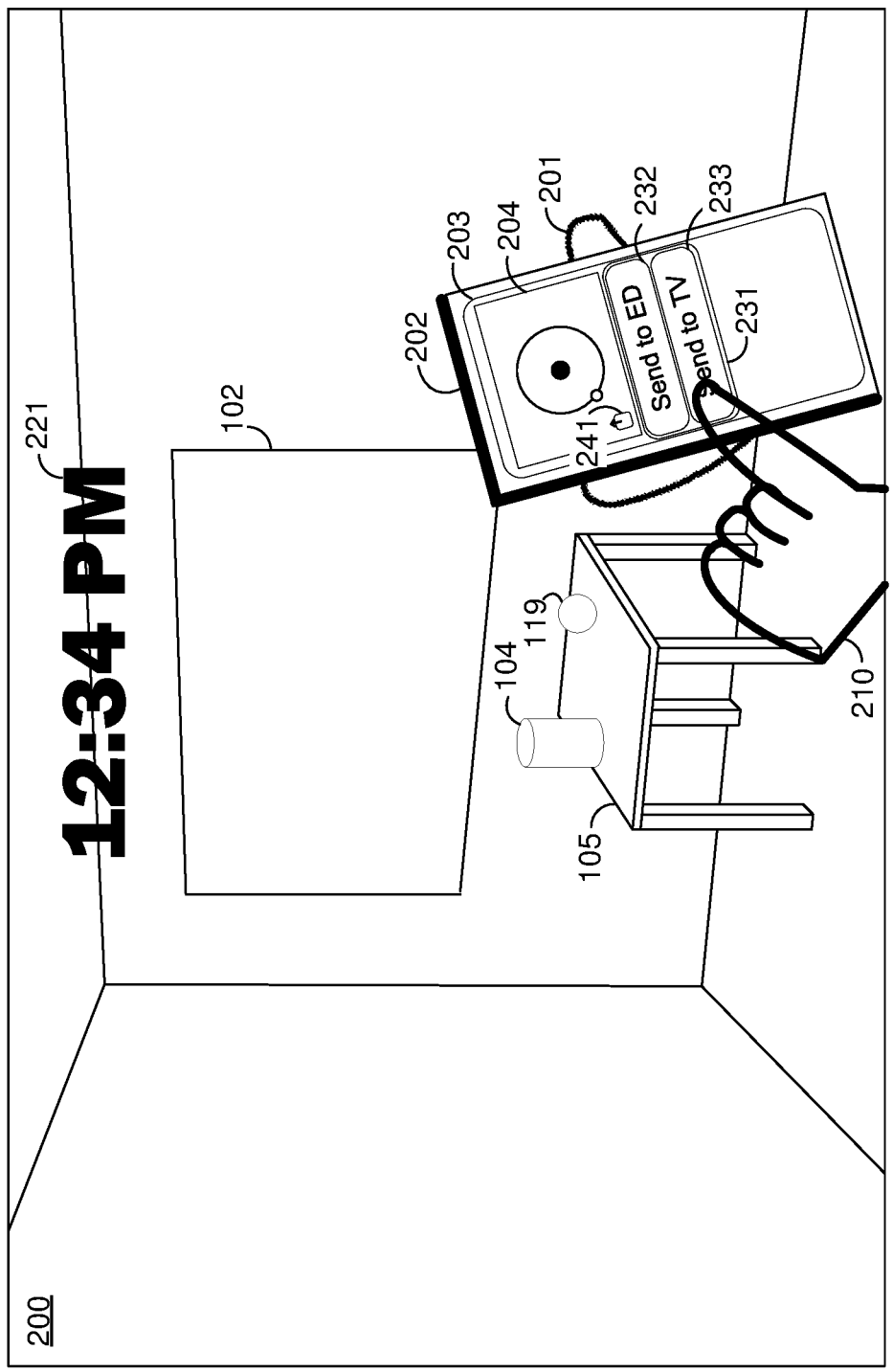
Figure 2O:
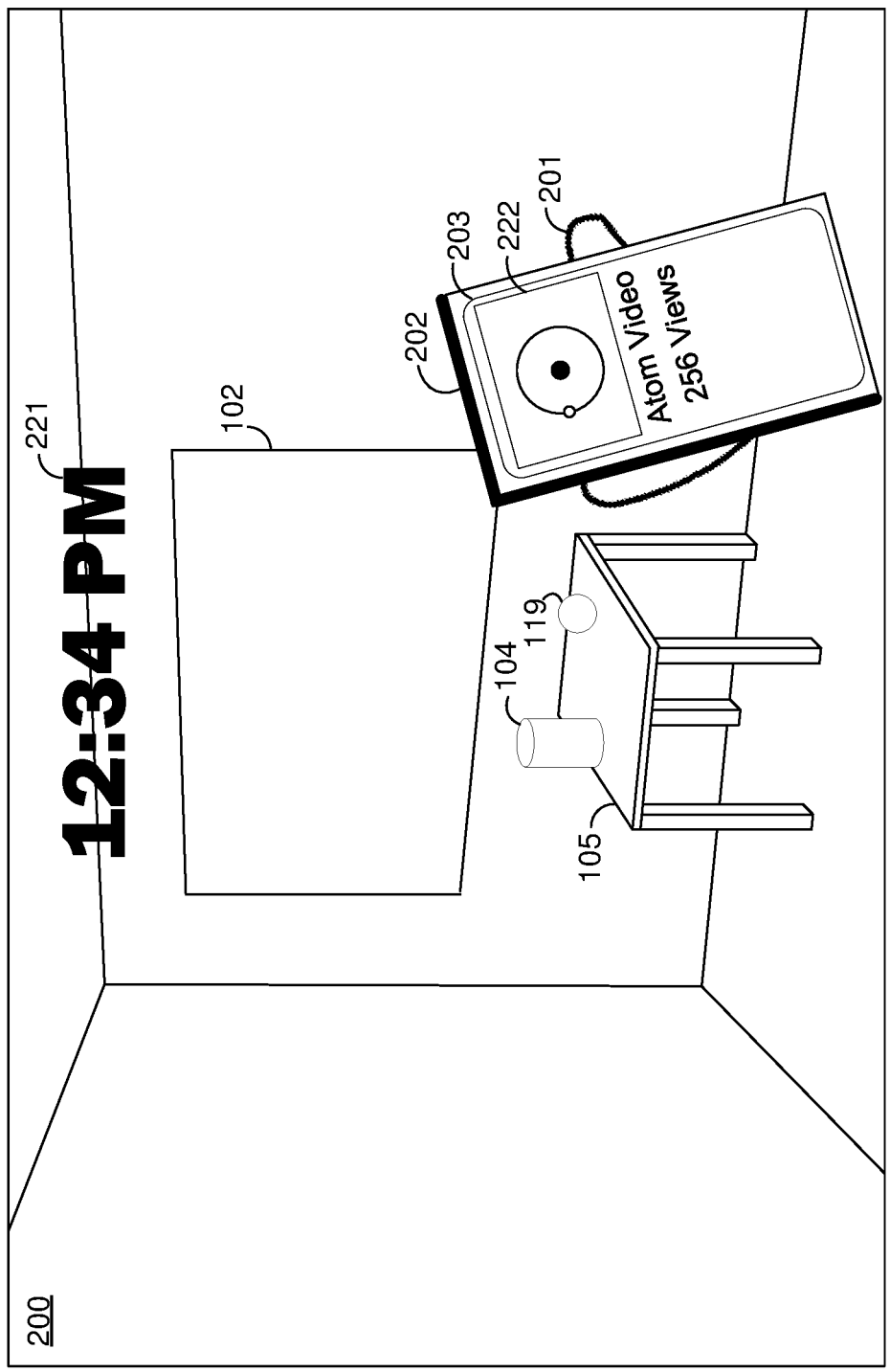
Figure 2P:
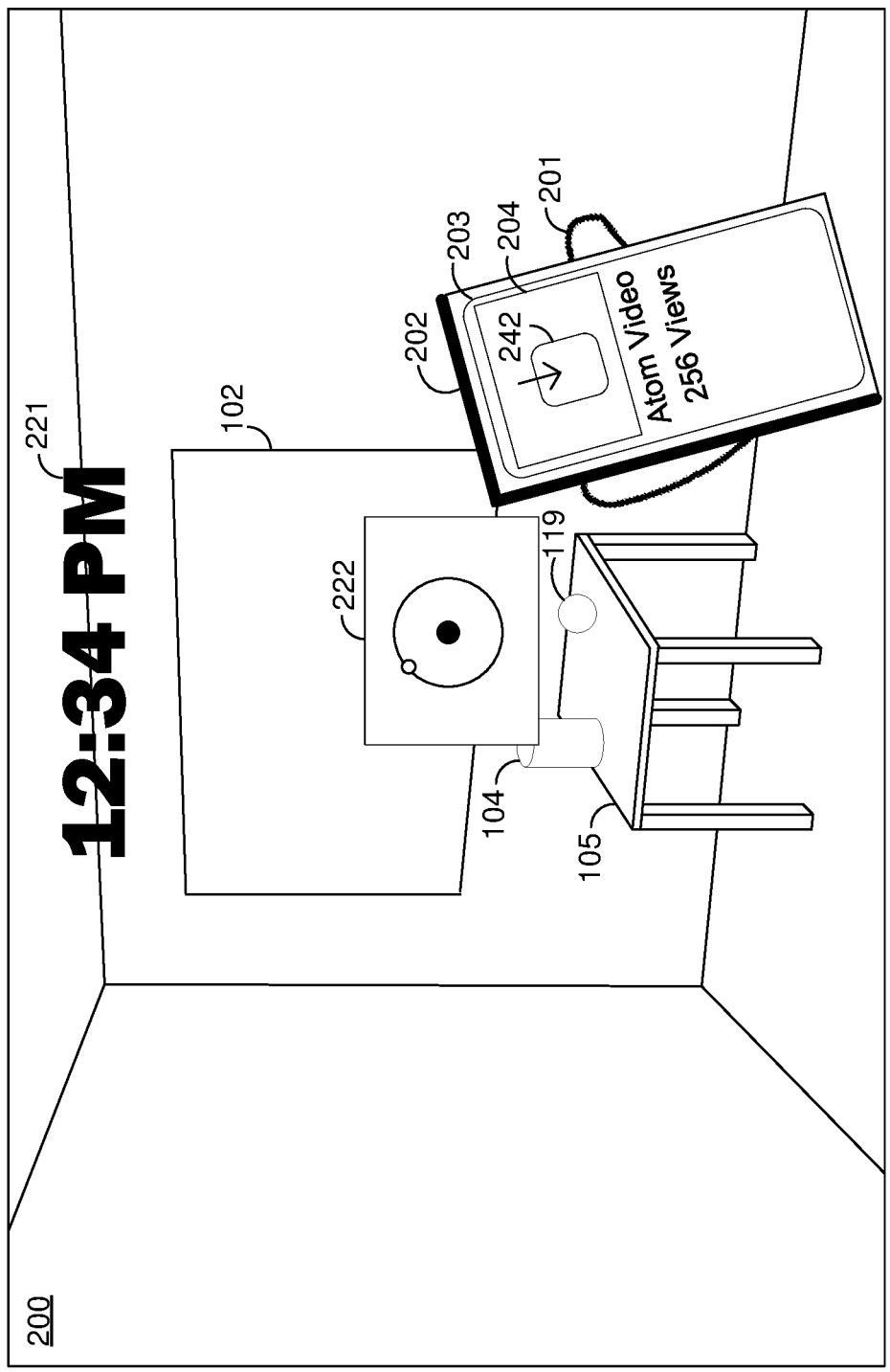
Figure 2Q:
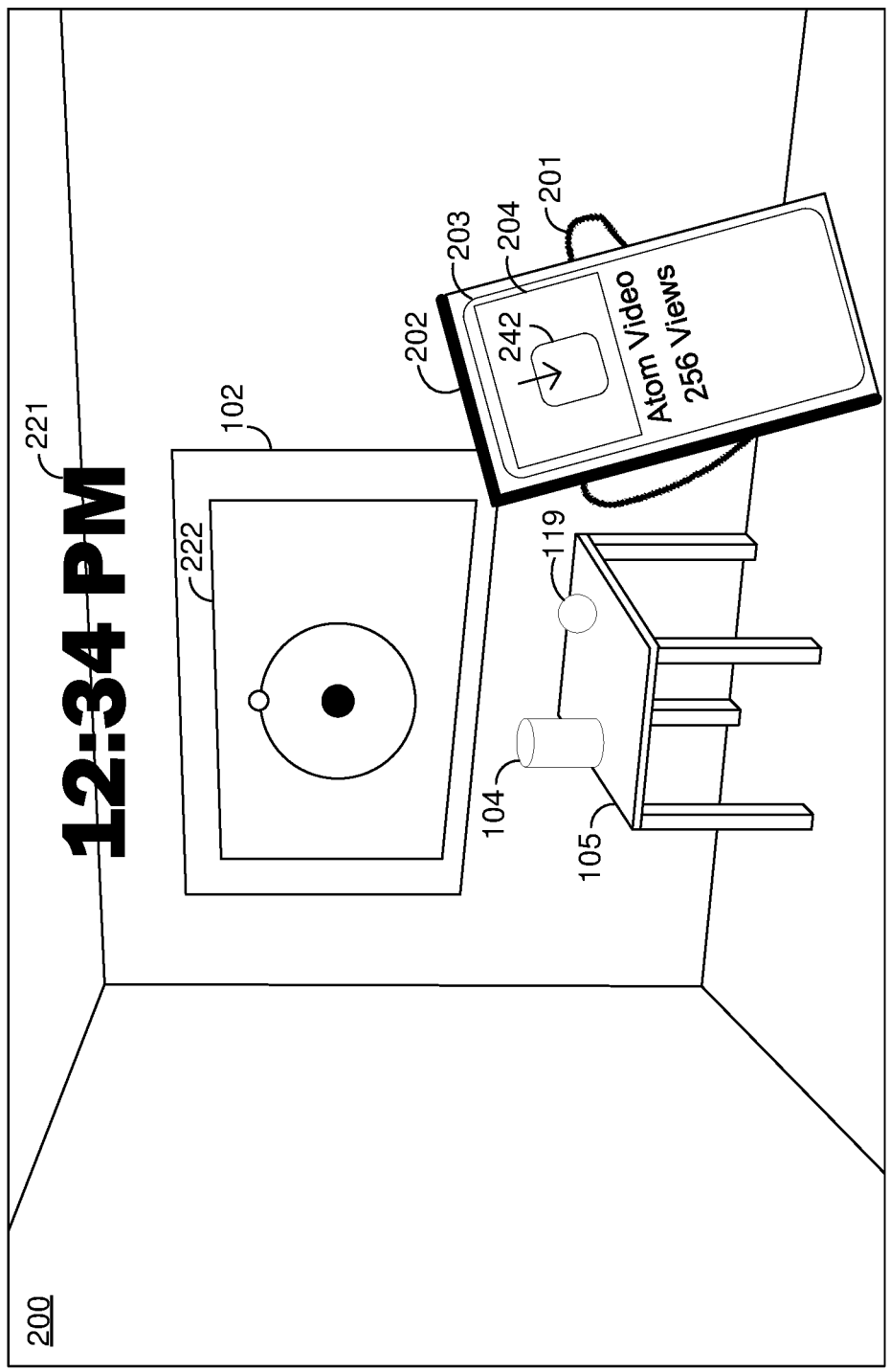
Figure 2R:
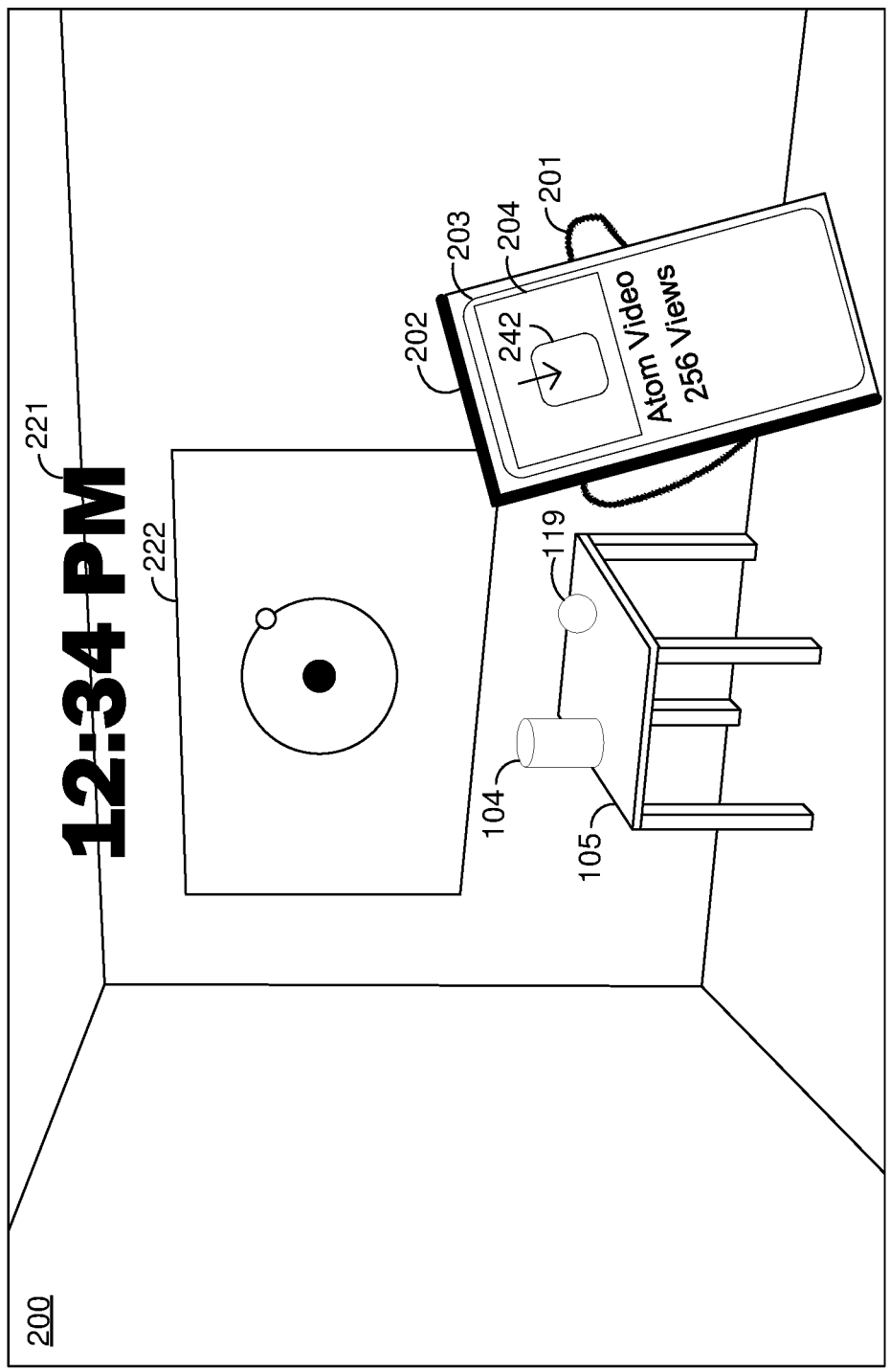
Figure 2S:
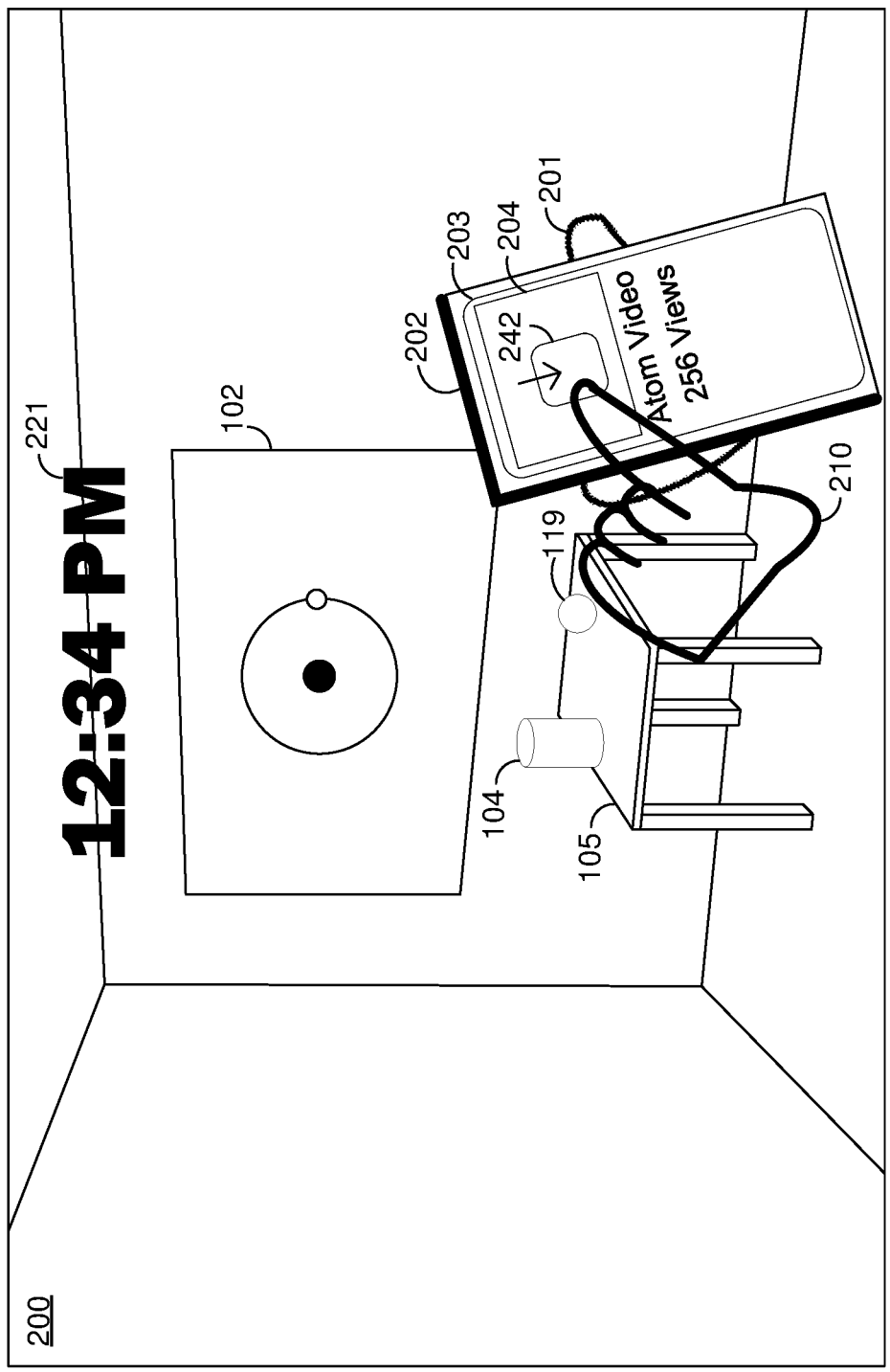
Figure 2T:
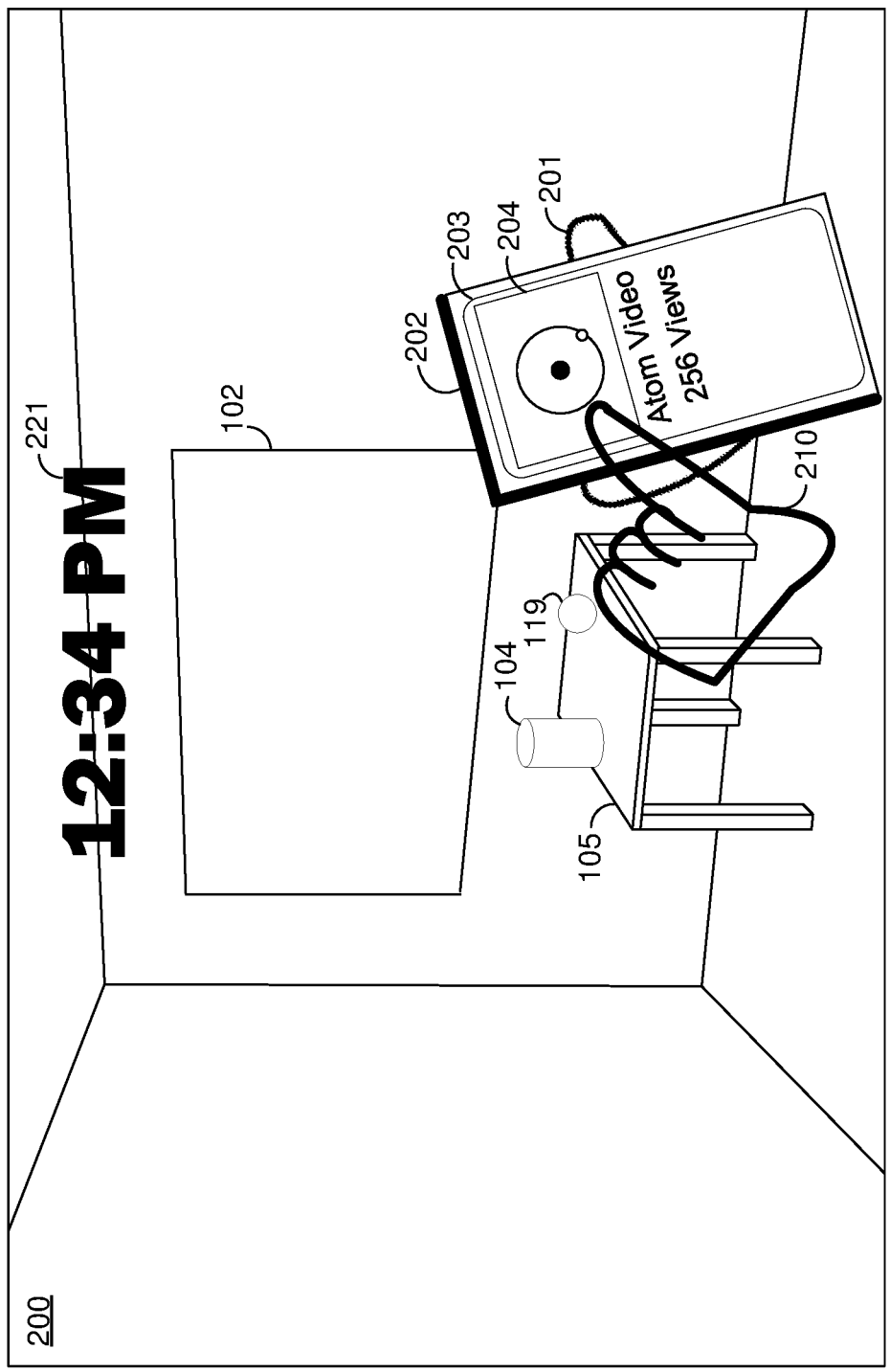
Figure 2U:
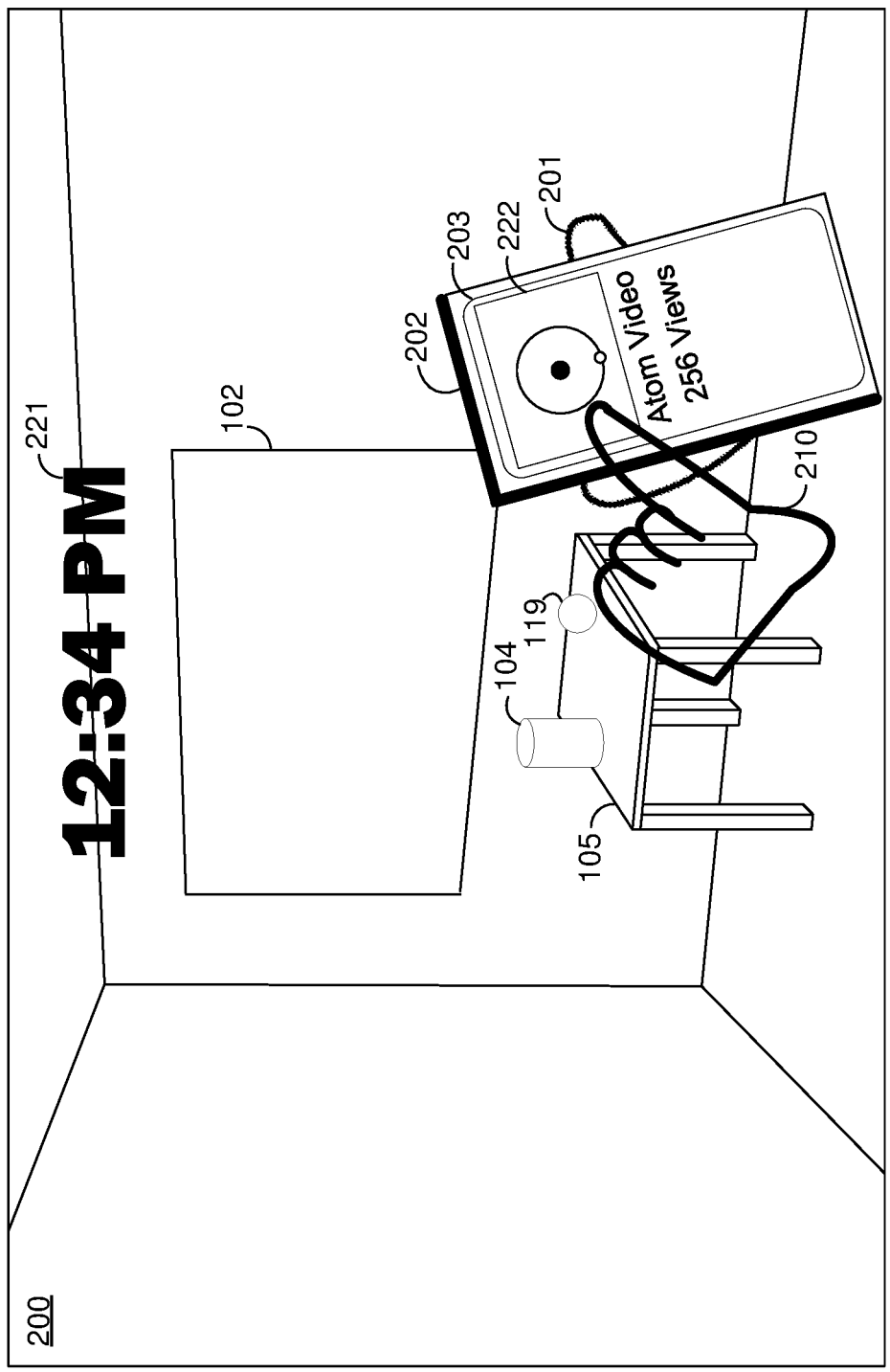
Figure 2V:
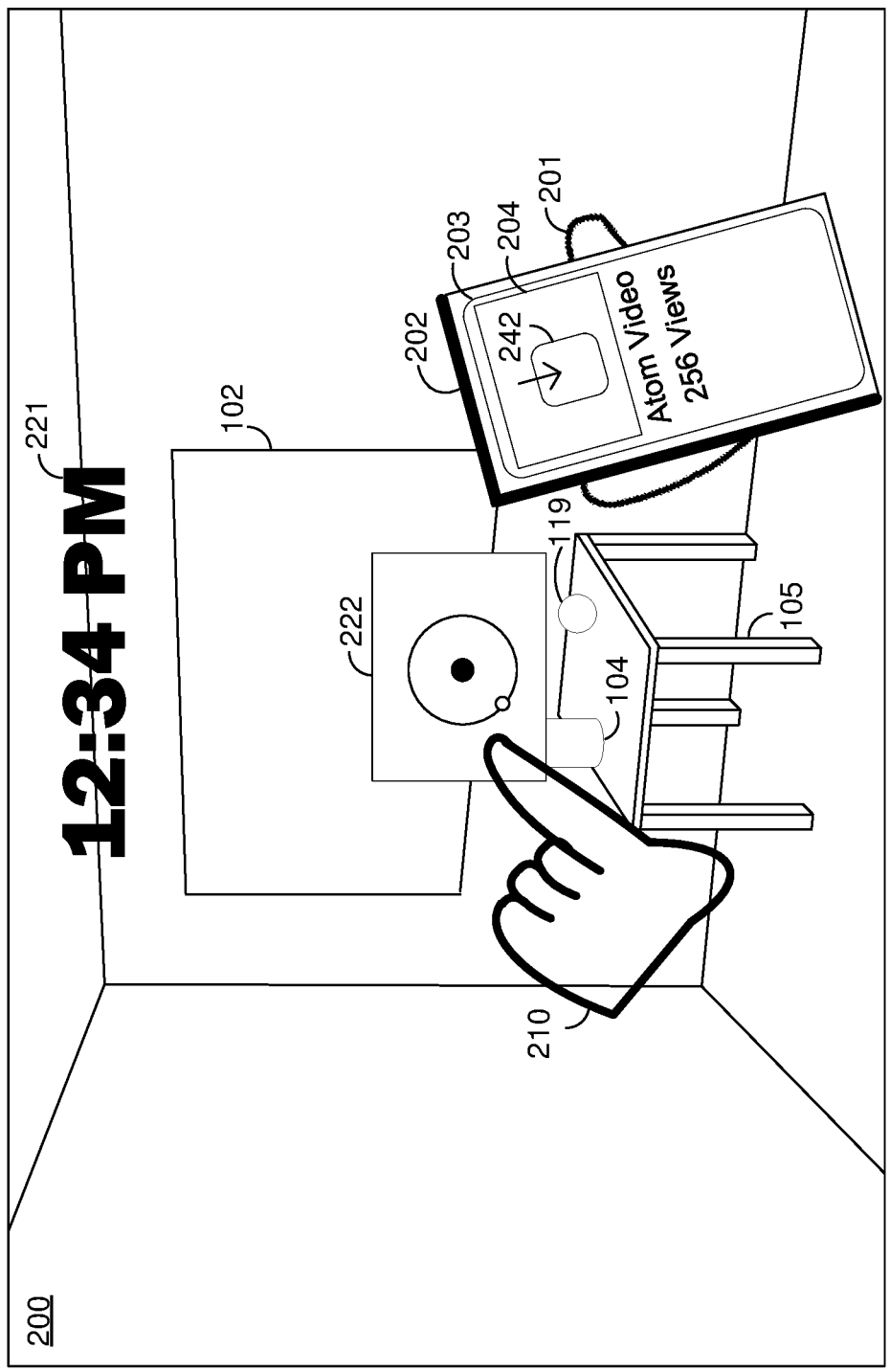
Figure 2W:
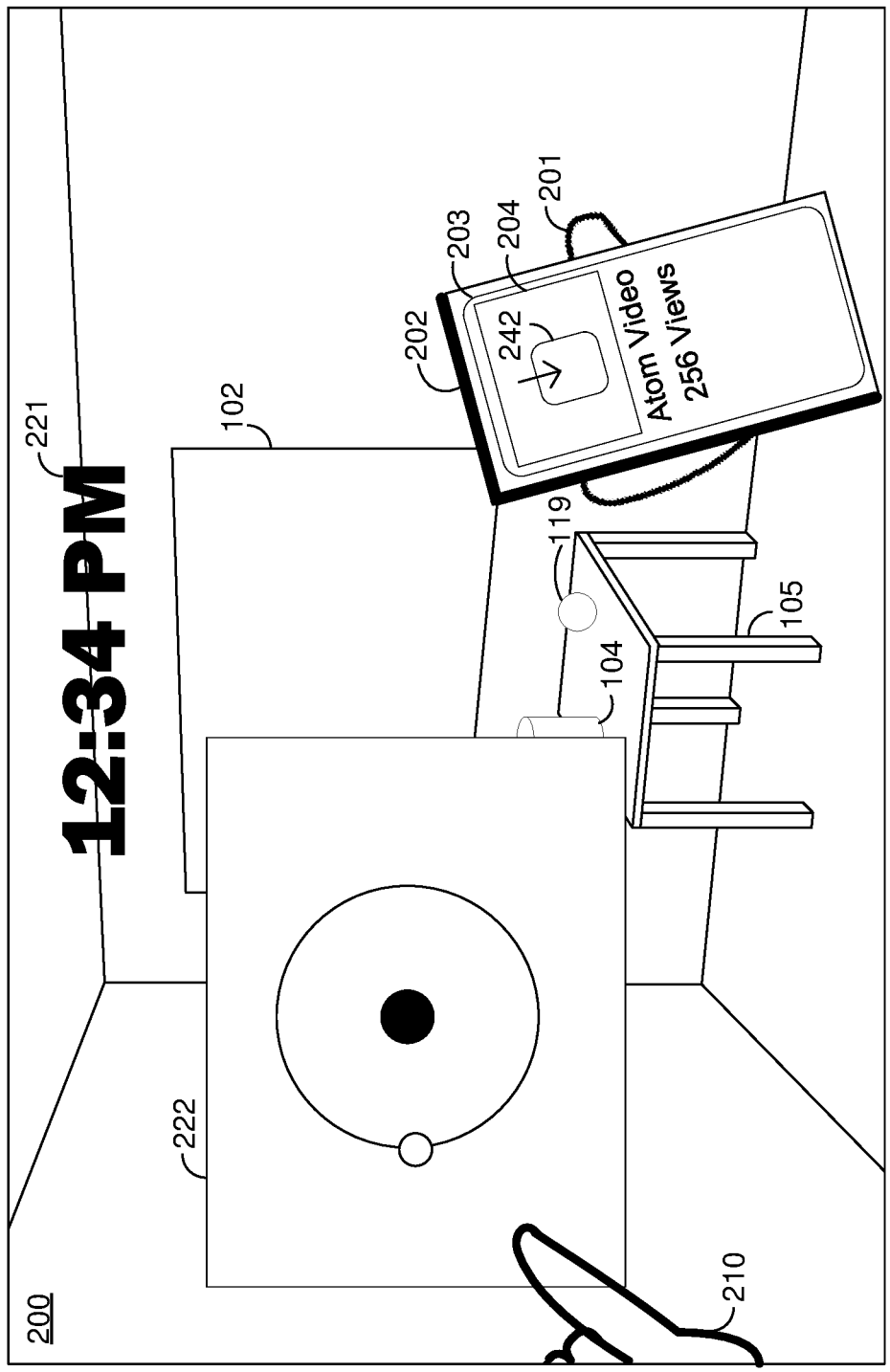

FIGS. 2A-2W illustrate an XR environment 200 presented, at least in part, by a display of an electronic device, such as the electronic device 110 of FIG. 1. The XR environment is based on the physical environment 101 of FIG. 1 in which the electronic device is present. The XR environment 200 includes a plurality of objects, including one or more physical objects (e.g., the television 102, the cylinder 104, the table 105, and a smartphone 202) of the physical environment and one or more virtual objects (e.g., the virtual ball 119 and a virtual clock 221). In various implementations, certain objects (such as the physical objects and the virtual ball 119) are presented at a location in the XR environment 200, e.g., at a location defined by three coordinates in a three-dimensional (3D) XR coordinate system such that while some objects may exist in the physical world and the others may not, a spatial relationship (e.g., distance or orientation) may be defined between them. Accordingly, when the electronic device moves in the XR environment 200 (e.g., changes either position and/or orientation), the objects are moved on the display of the electronic device, but retain their location in the XR environment 200. Such virtual objects that, in response to motion of the electronic device, move on the display, but retain their position in the XR environment 200 are referred to as world-locked objects.

In various implementations, certain virtual objects (such as the virtual clock 221) are displayed at locations on the display such that when the electronic device moves in the XR environment 200, the objects are stationary on the display on the electronic device. Such virtual objects that, in response to motion of the electronic device, retain their location on the display are referred to display-locked objects.

In various implementations, the location in the XR environment of certain virtual objects changes based on the pose of the body of the user. Such virtual objects are referred to as body-locked objects. For example, as the user moves in the physical environment 101, a body-locked virtual object maintains a location approximately one meter in front and half a meter to the left of the user (e.g., relative to the position and orientation of the user's torso). As the head of the user moves, without the body of the user moving, the body-locked virtual object appears at a fixed location in the XR environment.

FIGS. 2A-2W illustrate the XR environment during a series of time periods. In various implementations, each time period is an instant, a fraction of a second, a few seconds, a few hours, a few days, or any length of time. In various implementations, the time between subsequent time periods is an instant, a fraction of a second, a few seconds, a few hours, a few days, or any length of time.

At the series of time periods of FIGS. 2A-2W, the XR environment 200 includes a smartphone 202 held in the right hand 201 of a user. The smartphone 202 includes a display 203 that displays a video user interface including a video display portion 204.

Various ones of FIGS. 2A-2W illustrate a left hand 210 of a user. To better illustrate interaction of the left hand 210 with physical objects, such as the smartphone 202, and virtual objects such as user interface elements, the left hand 210 is illustrated as transparent.

FIG. 2A illustrates the XR environment 200 during a first time period. During the first time period, the video display portion 204 of the smartphone 202 displays a first frame of video content. The video content includes a video of an atom including an electron continuously rotating in a circular orbit around a proton. In the first frame, the electron is at 0 degrees in the orbit (e.g., directly above the proton).

FIG. 2B illustrates the XR environment 200 during a second time period subsequent to the first time period. During the second time period, the video display portion 204 displays a second frame of the video content. In the second frame, the electron is at 45 degrees in the orbit (e.g., above and to the right of the proton).

Whereas the video content is displayed at a frame rate, it is to be appreciated that the second frame of the video content may not be the next frame in the video content immediately subsequent to the first frame, but any frame following the first frame depending on the frame rate of the video content and the amount of time between the first time period and the second time period. Further, although FIGS. 2A and 2B illustrate the first frame during the first time period and the second frame during the second time period, it is to be appreciated that the smartphone 202 displays the intervening frames between the first time period and the second time period. Similarly, throughout FIGS. 2A-2W although only particular frames are illustrated, it is to be appreciated that various devices display the intervening frames at the frame rate between the time periods.

FIG. 2B illustrates the left hand 210 interacting with (e.g., tapping) the video display portion 204.

FIG. 2C illustrates the XR environment 200 at a third time period subsequent to the second time period. During the third time period, the video display portion 204 displays a third frame of the video content. In the third frame, the electron is at 90 degrees in the orbit (e.g., directly to the right of the proton).

In response to detecting the left hand 210 interacting with the video display portion 204, the smartphone 202 (or the electronic device) displays a device transfer affordance 241 over the video display portion 204. In various implementations, the smartphone 202 (or the electronic device) displays additional affordances over the video display portion 204, such as a pause/play affordance to pause (or resume) playback of the video content or a full screen affordance to enlarge the video display portion 204. FIG. 2C illustrates the left hand 210 interacting with (e.g., tapping) the device transfer affordance 241.

FIG. 2D illustrates the XR environment 200 at a fourth time period subsequent to the third time period. During the fourth time period, the video display portion 204 displays a fourth frame of the video content. In the fourth frame, the electron is at 135 degrees in the orbit (e.g., below and to the right of the proton).

In response to detecting the left hand 210 interacting with the device transfer affordance 241, the smartphone 202 (or the electronic device) displays a device transfer selection menu 231 in the video user interface below the video display portion 204. The device transfer selection menu 231 includes an electronic device affordance 232 for transferring display of video content to the electronic device (e.g., the electronic device 110) and a television affordance 233 for transferring display of the video content to the television 102. FIG. 2D illustrates the left hand 210 interacting with (e.g., tapping) the electronic device affordance 232.

FIG. 2E illustrates the XR environment 200 at a fifth time period subsequent to the fourth time period. During the fifth time period, the video display portion 204 is hidden behind a virtual video screen 222 displayed by the electronic device. The virtual video screen 222 is a world-locked virtual object generally at the location of the video display portion 204 on the display 203. The virtual video screen 222 displays a fifth frame of the video content. In the fifth frame, the electron is at 180 degrees in the orbit (e.g., directly below the proton).

Between the fourth time period and the fifth time period, for each frame of the video content between the fourth frame and the fifth frame, at least one of the video display portion 204 or the virtual video screen 222 displays the frame at the frame rate. In various implementations, when the electronic device begins displaying the video content in the virtual video screen 222, the smartphone 202 ceases to display the video content in the video display portion 204. In various implementations, there is a period of overlap in which both the virtual video screen 222 and the video display portion 204 display one or more frames of the video content. In various implementations, the video display portion 204 continues to display the video content while the virtual video screen 222 also displays the video content.

In various implementations, in response to detecting the left hand 210 interacting with the electronic device affordance 232, the smartphone 202 transmits a request to the electronic device to begin displaying the virtual video screen 222. In various implementations, the smartphone 202 (e.g., using images captured by a front-facing camera) determines the relative pose of the electronic device and the smartphone 202 and includes this information in the request to assist in the electronic device displaying the virtual video screen 222 at the location in the XR environment 200 of the video display portion 204. In various implementations, in response to receiving the request from the smartphone 202, the electronic device (e.g., using images captured by a scene camera) determines the relative pose of the smartphone 202 and the electronic device and uses this information to display the virtual video screen 222 at the location in the XR environment 200 of the video display portion 204.

FIG. 2F illustrates the XR environment 200 during a sixth time period subsequent to the fifth time period. During the sixth time period, the virtual video screen 222 displays a sixth frame of the video content. In the sixth frame, the electron is at 225 degrees in the orbit (e.g., below and to the left of the proton). Further, between the fifth time period and the sixth time period, while displaying the intervening frames of the video content, the virtual video screen 222 has moved in the XR environment 200 from a first location generally at the location of the video display portion 204 to a second location to the left and closer to the user. Further, the virtual video screen 222 has increased in size. Thus, the virtual video screen 222 appears slightly larger during the sixth time period than the fifth time period.

Further, during the sixth time period, the video display portion 204 does not display the video content, but displays a recall affordance 242 which, when selected transfers display of the video content back to the smartphone 202.

FIG. 2G illustrates the XR environment 200 during a seventh time period subsequent to the sixth time period. During the seventh time period, the virtual video screen 222 displays a seventh frame of the video content. In the seventh frame, the electron is at 270 degrees in the orbit (e.g., directly to the left of the proton). Further, between the sixth time period and the seventh time period, while displaying the intervening frames of the video content, the virtual video screen 222 has moved in the XR environment 200 from the second location to a third location to the left and closer to the user. Further, the virtual video screen 222 has increased in size. Thus, the virtual video screen 222 appears slightly larger during the seventh time period than the sixth time period.

Thus, FIGS. 2D-2G illustrate an animation transitioning display of the video content from the smartphone 202 to the electronic device. In various implementations, at the termination of the animation, the electronic device converts the virtual video screen 222 from a world-locked virtual object into a body-locked virtual object or a display-locked virtual object.

FIG. 2G illustrates the left hand 210 interacting with (e.g., tapping) the virtual video screen 222.

FIG. 2H illustrates the XR environment 200 at an eighth time period subsequent to the seventh time period. During the eighth time period, the virtual video screen 222 displays an eighth frame of the video content. In the eighth frame, the electron is at 315 degrees in the orbit (e.g., above and to the left of the proton).

In response to detecting the left hand 210 interacting with the virtual video screen 222, the electronic device displays a device transfer affordance 251 over the virtual video screen 222. In various implementations, the virtual video screen 222 displays additional affordances over the virtual video screen 222, such as a pause/play affordance to pause (or resume) playback of the video content or a full screen affordance to enlarge the virtual video 222. In various implementations, the virtual video screen 222 is enlarged into an immersive display-spanning display-locked virtual object. FIG. 2H illustrates the left hand 210 interacting with (e.g., tapping) the device transfer affordance 251.

FIG. 2I illustrates the XR environment 200 at a ninth time period subsequent to the eighth time period. During the ninth time period, the virtual video screen 222 displays a ninth frame of the video content. In the ninth frame, the electron is at 0 degrees in the orbit.

In response to detecting the left hand 210 interacting with the device transfer affordance 251, the electronic device displays a device transfer selection menu 223 below the virtual video screen 222. In various implementations, the device transfer selection menu 223 is a display-locked virtual object, body-locked virtual object, or a world-locked virtual object. In particular, in various implementations, the device transfer selection menu 223 is locked to the same reference frame as the virtual video screen 222. The device transfer selection menu 223 includes a phone affordance 234 for transferring display of the video content to the smartphone 202 and a television affordance 235 for transferring display of the video content to the television 102. FIG. 2I illustrates the left hand 210 interacting with (e.g., tapping) the phone affordance 234.

FIG. 2J illustrates the XR environment 200 during a tenth time period subsequent to the ninth time period. During the tenth time period, the virtual video screen 222 displays a tenth frame of the video content. In the tenth frame, the electron is at 45 degrees in the orbit. Further, between the ninth time period and the tenth time period, while displaying the intervening frames of the video content, the virtual video screen 222 has moved in the XR environment 200 from the third location back to the second location. Further, the virtual video screen 222 has decreased in size.

FIG. 2K illustrates the XR environment 200 at an eleventh time period subsequent to the tenth time period. During the eleventh time period, the video display portion 204 is hidden behind the virtual video screen 222. The virtual video screen 222 displays an eleventh frame of the video content. In the eleventh frame, the electron is at 90 degrees in the orbit. Further, between the tenth time period and the eleventh time period, while displaying the intervening frames of the video content, the virtual video screen 222 has moved in the XR environment 200 from the second location to the first location generally at the location of the video display portion 204. Further, the virtual video screen 222 has decreased in size.

In various implementations, in response to detecting the left hand 210 interacting with the phone affordance 234, the electronic device transmits a request to the smartphone 202 to initiate recapture of the video content. In various implementations, in response to the request, the smartphone 202 (e.g., using images captured by a front-facing camera) determines the relative pose of the electronic device and the smartphone 202 and transmits this information to the electronic device to assist in the electronic device displaying the virtual video screen 222 at the location in the XR environment 200 of the video display portion 204. In various implementations, in response to detecting the left hand interacting with the phone affordance 234, the electronic device (e.g., using images captured by a scene camera) determines the relative pose of the smartphone 202 and the electronic device and uses this information to display the virtual video screen 222 at the location in the XR environment 200 of the video display portion 204.

FIG. 2L illustrates the XR environment 200 during a twelfth time period subsequent to the eleventh time period. During the twelfth time period, the video display portion 204 displays a twelfth frame of the video content. In the twelfth frame, the electron is at 135 degrees in the orbit.

Between the eleventh time period and the twelfth time period, for each frame of the video content between the eleventh frame and the twelfth frame, at least one of the virtual video screen 222 or the video display portion 204 displays the frame at the frame rate. In various implementations, when the smartphone 202 begins displaying the video content in the video display portion 204, the electronic device ceases to display the virtual video screen 222. Accordingly, at the twelfth time period, the virtual video screen 222 is not displayed. In various implementations, there is a period of overlap in which both the virtual video screen 222 and the video display portion 204 display one or more frames of the video content.

FIG. 2L illustrates the left hand 210 interacting with (e.g., tapping) the video display portion 204.

FIG. 2M illustrates the XR environment 200 at a thirteenth time period subsequent to the twelfth time period. During the thirteenth time period, the video display portion 204 displays a thirteenth frame of the video content. In the thirteenth frame, the electron is at 180 degrees in the orbit.

In response to detecting the left hand 210 interacting with the video display portion 204, the smartphone 202 displays the device transfer affordance 241 over the video display portion 204. FIG. 2M illustrates the left hand 210 interacting with (e.g., tapping) the device transfer affordance 241.

FIG. 2N illustrates the XR environment 200 at a fourteenth time period subsequent to the thirteenth time period. During the fourteenth time period, the video display portion 204 displays a fourteenth frame of the video content. In the fourteenth frame, the electron is at 225 degrees in the orbit.

In response to detecting the left hand 210 interacting with the device transfer affordance 241, the smartphone 202 displays the device transfer selection menu 231 in the video user interface below the video display portion 204 including the electronic device affordance 232 and the television affordance 233. FIG. 2N illustrates the left hand 210 interacting with (e.g., tapping) the television affordance 233.

FIG. 2O illustrates the XR environment 200 at a fifteenth time period subsequent to the fourteenth time period. During the fifteenth time period, the video display portion 204 is hidden behind the virtual video screen 222 displayed by the electronic device. The virtual video screen 222 displays a fifteenth frame of the video content. In the fifteenth frame, the electron is at 270 degrees in the orbit.

Between the fourteenth time period and the fifteenth time period, for each frame of the video content between the fourteenth frame and the fifteenth frame, at least one of the video display portion 204 or the virtual video screen 222 displays the frame at the frame rate. In various implementations, when the electronic device begins displaying the video content in the virtual video screen 222, the smartphone 202 ceases to display the video content in the video display portion 204. In various implementations, there is a period of overlap in which both the virtual video screen 222 and the video display portion 204 display one or more frames of the video content. In various implementations, the video display portion 204 continues to display the video content while the virtual video screen 222 also displays the video content.

In various implementations, in response to detecting the left hand 210 interacting with the television affordance 233, the smartphone 202 transmits a request to the electronic device to begin displaying the virtual video screen 222. The smartphone 202 further transmits a request to the television 102 to prepare to display the video content (e.g., by downloading the video content). In various implementations, the smartphone 202 (e.g., using images captured by a front-facing camera) determines the relative pose of the electronic device and the smartphone 202 and includes this information in the request to assist in the electronic device displaying the virtual video screen 222 at the location in the XR environment 200 of the video display portion 204. In various implementations, in response to receiving the request from the smartphone 202, the electronic device (e.g., using images captured by a scene camera) determines the relative pose of the smartphone 202 and the electronic device and uses this information to display the virtual video screen 222 at the location in the XR environment 200 of the video display portion 204. Further, in response to receiving the request from the smartphone 202, the electronic device determines the relative pose of the television and the electronic device. The electronic device (as described below) uses this information to display the virtual video screen 222 at the location in the XR environment 200 of the television 102.

FIG. 2P illustrates the XR environment 200 during a sixteenth time period subsequent to the fifteenth time period. During the sixteenth time period, the virtual video screen 222 displays a sixteenth frame of the video content. In the sixteenth frame, the electron is at 315 degrees in the orbit (e.g., above and to the left of the proton). Further, between the fifteenth time period and the sixteenth time period, while displaying the intervening frames of the video content, the virtual video screen 222 has moved in the XR environment 200 from a first location generally at the location of the video display portion 204 to a fourth location to the left and further from the user. Further, the virtual video screen 222 has increased in size (or changed to an intermediate size between that of the smartphone 202 and the television 102).

Further, during the sixteenth time period, the video display portion 204 does not display the video content, but displays the recall affordance 242 which, when selected transfers display of the video content back to the smartphone 202.

FIG. 2Q illustrates the XR environment 200 during a seventeenth time period subsequent to the sixteenth time period. During the seventeenth time period, the virtual video screen 222 displays a seventeenth frame of the video content. In the seventh frame, the electron is at 0 degrees in the orbit. Further, between the sixteenth time period and the seventeenth time period, while displaying the intervening frames of the video content, the virtual video screen 222 has moved in the XR environment 200 from the fourth location to a fifth location further from the user. Further, the virtual video screen 222 has increased in size.

FIG. 2R illustrates the XR environment 200 at an eighteenth time period subsequent to the seventeenth time period. During the eighteenth time period, the television 102 is hidden behind the virtual video screen 222. The virtual video screen 222 displays an eighteenth frame of the video content. In the eleventh frame, the electron is at 45 degrees in the orbit. Further, between the seventeenth time period and the eighteenth time period, while displaying the intervening frames of the video content, the virtual video screen 222 has moved in the XR environment 200 from the fifth location to a sixth location generally at the location of the television 102. Further, the virtual video screen 222 has increased in size.

In various implementations, when the electronic device displays the virtual video screen 222 at the location of the television 102, the electronic device transmits a request to the television 102 to begin displaying the video content.

FIG. 2S illustrates the XR environment 200 during a nineteenth time period subsequent to the eighteenth time period. During the nineteenth time period, the television 102 displays a nineteenth frame of the video content. In the nineteenth frame, the electron is at 90 degrees in the orbit.

Between the eighteenth time period and the nineteenth time period, for each frame of the video content between the eighteenth frame and the nineteenth frame, at least one of the virtual video screen 222 or the television 102 displays the frame at the frame rate. In various implementations, when the television 102 begins displaying the video content, the electronic device ceases to display the virtual video screen 222. Accordingly, at the nineteenth time period, the virtual video screen 222 is not displayed. In various implementations, there is a period of overlap in which both the virtual video screen 222 and the television 102 display one or more frames of the video content.

FIG. 2S illustrates the left hand 210 interacting with (e.g., tapping) the recall affordance 242.

FIG. 2T illustrates the XR environment 200 during a twentieth time period subsequent to the nineteenth time period. During the twentieth time period, the video display portion 204 displays a twentieth frame of the video content. In the twentieth frame, the electron is at 135 degrees in the orbit. Thus, in response to detecting the left hand interacting with the recall affordance 242, the video content is no longer displayed by the television 102 and is displayed by the smartphone 202. In various implementations, the electronic device displays an animation of the video content (e.g., the virtual video screen 222) moving from the sixth location generally at the location of the television 102 to the first location generally at the location of the video display portion 204. However, as a user's gaze may already be directed to the smartphone 202 in order to interact with the recall affordance 242, in various implementations, an animation is not displayed.

FIG. 2T illustrates the left hand 210 interacting with (e.g., touching for at least a threshold amount of time) the video display portion 204.

FIG. 2U illustrates the XR environment 200 during a twenty-first time period subsequent to the twentieth time period. During the twenty-first time period, the electronic device displays the virtual video screen 222 at the first location generally at the location of the video display portion 204. During the twenty-first time period, the video display portion 204 displays a twenty-first frame of the video content. In the twenty-first frame, the electron is at 180 degrees in the orbit. FIG. 2U illustrates the left hand 210 at the same location as in FIG. 2T, now interacting with (e.g., touching) the virtual video screen 222.

FIG. 2V illustrates the XR environment 200 during a twenty-second time period subsequent to the twenty-first time period. During the twenty-second time period, the virtual video screen 222 displays a twenty-second frame of the video content. In the twenty-second frame, the electron is at 225 degrees in the orbit. Further, between the twenty-first time period and the twenty-second time period, while displaying the intervening frames of the video content and in response to corresponding movement of the left hand 210, the virtual video screen 222 has moved in the XR environment 200 from a first location generally at the location of the video display portion 204 to the second location to the left and closer to the user. Further, the virtual video screen 222 has increased in size. Further, during the twenty-second time period, the video display portion 204 does not display the video content, but displays the recall affordance 242.

FIG. 2W illustrates the XR environment 200 during a twenty-third time period subsequent to the twenty-second time period. During the twenty-third time period, the virtual video screen 222 displays a twenty-third frame of the video content. In the twenty-third frame, the electron is at 270 degrees in the orbit. Further, between the twenty-second time period and the twenty-third time period, while displaying the intervening frames of the video content and in response to corresponding movement of the left hand 210, the virtual video screen 222 has moved in the XR environment 200 from the second location to the third location. Further, the virtual video screen 222 has increased in size.

Thus, transferring the display of content can be performed in response to user input corresponding to the selection of an affordance or user input corresponding to dragging the video content into the XR environment 200. In various implementations, the display of video content is transferred from the smartphone 202 to the television 102 in response to a user input dragging the video content from the smartphone 202 to a location of the television 102 or in a direction of the television 102. In various implementations, transferring the display of content from the smartphone 202 to the television 102 can be performed in response to detecting a user gaze at the location of the television 102 for at least a threshold amount of time. In various implementations, transferring the display of content from the smartphone 202 to the electronic device can be performed in response to detecting the user moving the smartphone 202 closer to the user (e.g., presumably to see the video content better). In various implementations, transferring the display of content from the smartphone 202 to the electronic device or television 102 can be performed in response to a vocal command. In various implementations, transferring the display of content can be performed automatically without user input. For example, in various implementations, the video content may be high-definition, high-resolution, and/or HDR (High Dynamic Range) video content and it may be determined that the smartphone 202 is an unsuitable (or less preferred) device to display the video content. In response, display of the video content may be transferred to the electronic device or the television 102.

FIG. 3 is a flowchart representation of a method 300 of transferring the display of video content from a first location to a second location in accordance with some implementations. In various implementations, the method 300 is performed by a first device, in a physical environment, with an image sensor, a first display, one or more processors, and non-transitory memory. In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the first device detecting a second device in a field-of-view of the image sensor displaying video content at a first location in the physical environment on a second display. In various implementations, the first device detects the second device in the field-of-view of the image sensor based on an image of the physical environment taken by the first device and including the second device. In various implementations, the first device detects the second device in the field-of-view of the image sensor based on a message received from the second device (e.g., a transfer request as described below). In various implementations, the first device does not detect the second device in the field-of-view of the image sensor based on an image of the physical environment, but detects that the second device is within the field-of-view of the image sensor video content based only on the message from the second device which is generated, by the second device, in response to the second device detecting that the second device is within the field-of-view of the image sensor, e.g., based on an image of the physical environment taken by the second device and including the first device.

For example, in FIG. 2A, the electronic device detects the smartphone 202 within the field-of-view of the image sensor of the electronic device displaying the video of the atom at the first location in the physical environment 101 of the video display region 204.

The method 300 continues, in block 320, with the first device detecting a transfer trigger to display the video content at a second location in the physical environment. In various implementations, detecting the transfer trigger includes receiving, from the second device, a transfer request. In various implementations, the transfer request is generated in response to a user input. For example, in FIG. 2T, the left hand 210 touches the video display portion 204 for at least a threshold amount of time as detected, in various implementations, by the smartphone 202. In various implementations, the user input includes selection of a device transfer affordance. For example, in FIG. 2D, the left hand 210 taps the electronic device affordance 232. In various implementations, the transfer request is generated in response to a determination that the second device is inferior to present the video content. For example, in various implementations, the smartphone 202 determines that the video content is high-definition, high-resolution, and/or HDR video content and determines that the electronic device and/or the television 102 is a superior device to display the content.

In various implementations, detecting the transfer trigger includes detecting a user input. For example, in FIG. 2T, the left hand 210 touches the video display portion 204 for at least a threshold amount of time as detected, in various implementations, by the electronic device 202. In various implementations, detecting the transfer trigger includes detecting that a gaze of the user is at the second location. For example, in various implementations, if the user gazes at the television 102 for at least a threshold amount of time, the display of video content is transferred to the television 102. In various implementations, detecting the transfer trigger includes detecting motion of the second device towards the first device, e.g., presumably to see the video content better.

The method 300 continues, in block 330, with the device, in response to detecting the transfer trigger, displaying, on the first display, a transfer animation of the video content being moved from the first location to the second location. For example, in FIGS. 2E-2G, the electronic device displays an animation of the video content being moved from the first location of the video display portion 204 to the third location. As another, in FIGS. 20-2R, the electronic device displays an animation of the video content being moved from the first location of the video display portion 204 to the sixth location of the television 102.

In various implementations, displaying the transfer animation includes determining a relative pose in the physical environment of the first device and the second device. In various implementations, determining the relative pose includes receiving, from the second device, relative pose information (e.g., in the transfer request). In various implementations, determining the relative pose includes detecting the second device in an image of the physical environment.

In various implementations, displaying the transfer animation includes displaying a plurality of frames of the video content. For example, in FIGS. 2E-2G, the electronic device displays an animation of the video content including at least the fifth frame, the sixth frame, and the seventh frame. As another example, in FIGS. 20-2R, the electronic device displays an animation of the video content including at least the fifteenth frame, the sixteenth frame, the seventeenth frame, and the eighteenth frame. In various implementations, the second device displays the video content of the first content at a frame rate and the first device displays the plurality of frames of the video content at the frame rate. In various implementations, the first device displays the plurality of frames of the video content at a lower frame rate (e.g., at half the frame rate, a quarter of the frame rate, or a tenth of the frame rate).

In various implementations, the first device obtains the plurality of frames from the first device. In various implementations, the transfer request includes a server location at which the first device can obtain the plurality of frames. In various implementations, the transfer request includes timing information (e.g., a timestamp) indicating at which time to present which frames.

In various implementations, a duration of the transfer animation is based on a distance between the first location and the second location. Thus, in various implementations, different animations (e.g., the animation of FIGS. 2E-2G and the animation of FIGS. 20-2R) generally have the same speed. In various implementations, a speed of the transfer animation is based on a distance between the first location and the second location. Thus, in various implementations, different animations generally have the same duration.

In various implementations, the method 300 further includes transmitting, to the second device, a transfer response to cease display of the video content by the second device. In various implementations, the transfer response is sent while the video content is displayed at the first location. For example, in FIG. 2E, once the electronic device has begun to display the video content at the location of video display portion 204, the electronic device transmits a transfer response to the smartphone 202 to cease displaying the video content.

In various implementations, the method 300 further includes transmitting, to a third device at the second location, a transfer response to begin display of the video content by the third device. In various implementations, the transfer response is sent while the video content is displayed at the second location. For example, in FIG. 2R, once the electronic device has begun to display the video content at the location of the television 102, the electronic device transmits a transfer response to the television to begin displaying the video content. In various implementations, in response to the first device confirming (using an image of the physical environment or a message from the third device) that the third device has begun to display the video content, the first device ceases to display the video content.

In various implementations, the method 300 further includes detecting a return trigger to return display of the video content to the second device in the physical environment and, in response to detecting the return trigger, displaying, on the first display, a return animation of the video content being moved from the second location to a third location, e.g., a current location of a video display region of the second device which, if the second device has not moved, is the same as the first location. For example, in FIGS. 2I-2K, the electronic device displays an animation returning the video content to the first location of the video display region 204. In various implementations, detecting the return trigger includes detecting a user input. For example, in FIG. 2I, the electronic device detects selection of the phone affordance 234. In various implementations, detecting the return trigger includes receiving, from the second device, a return request. For example, in FIG. 2S, the smartphone 202 generates a return request in response to user selection of the recall affordance 242. In various implementations, displaying the return animation of the video is performed in response to determining that a gaze of the user is at the second location. For example, in FIG. 2I, the user may generally be looking at the virtual video screen 222 and may benefit from the animation. However, in FIG. 2S, the user may be looking at the recall affordance 242 and not the television 102 and may not benefit from the animation.

Figure 4:
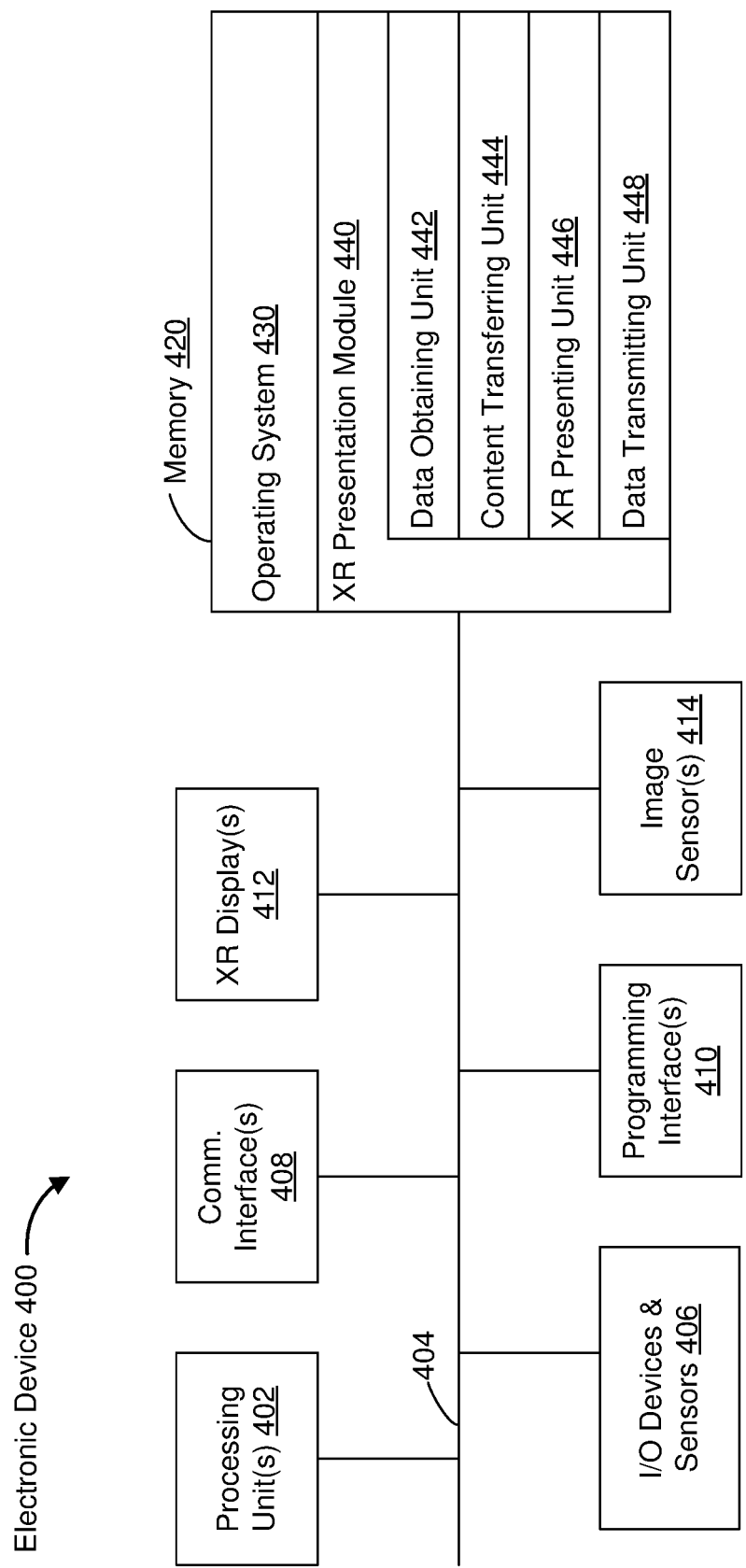
FIG. 4 is a block diagram of an electronic device in accordance with some implementations.

FIG. 4 is a block diagram of an electronic device 400 in accordance with some implementations. In various implementations, the electronic device 400 corresponds to the electronic device 110 of FIG. 1 or the electronic device of FIGS. 2A-2W. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 400 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, one or more XR displays 412, one or more optional interior- and/or exterior-facing image sensors 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 412 are configured to provide the XR experience to the user. In some implementations, the one or more XR displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 412 correspond to diffractive, reflective, polarized, holographic, etc. waveguide displays. For example, the electronic device 400 includes a single XR display. In another example, the electronic device 400 includes an XR display for each eye of the user. In some implementations, the one or more XR displays 412 are capable of presenting MR and VR content.

In some implementations, the one or more image sensors 414 are configured to obtain image data that corresponds to at least a portion of the face of the user that includes the eyes of the user (any may be referred to as an eye-tracking camera). In some implementations, the one or more image sensors 414 are configured to be forward-facing so as to obtain image data that corresponds to the physical environment as would be viewed by the user if the electronic device 400 was not present (and may be referred to as a scene camera). The one or more optional image sensors 414 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and an XR presentation module 440.

The operating system 430 includes procedures for handling various basic system services and for performing hardware dependent tasks. In some implementations, the XR presentation module 440 is configured to present XR content to the user via the one or more XR displays 412. To that end, in various implementations, the XR presentation module 440 includes a data obtaining unit 442, a content transferring unit 444, an XR presenting unit 446, and a data transmitting unit 448.

In some implementations, the data obtaining unit 442 is configured to obtain data (e.g., presentation data, interaction data, sensor data, location data, etc.) from other components of the electronic device 400. To that end, in various implementations, the data obtaining unit 442 includes instructions and/or logic therefor, and heuristics and metadata therefor.

In some implementations, the content transferring unit 444 is configured to display an animation of content moving from a first location to a second location. To that end, in various implementations, the content transferring unit 444 includes instructions and/or logic therefor, and heuristics and metadata therefor.

In some implementations, the XR presenting unit 446 is configured to present XR content via the one or more XR displays 412. To that end, in various implementations, the XR presenting unit 446 includes instructions and/or logic therefor, and heuristics and metadata therefor.

In some implementations, the data transmitting unit 448 is configured to transmit data (e.g., presentation data, location data, etc.) to other components of the electronic device 400. To that end, in various implementations, the data transmitting unit 448 includes instructions and/or logic therefor, and heuristics and metadata therefor.

Although the data obtaining unit 442, the content transferring unit 444, the XR presenting unit 446, and the data transmitting unit 448 are shown as residing on a single device (e.g., the electronic device 400), it should be understood that in other implementations, any combination of the data obtaining unit 442, the content transferring unit 444, the XR presenting unit 446, and the data transmitting unit 448 may be located in separate computing devices.

Moreover, FIG. 4 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a first device, in a physical environment, including an image sensor, a first display, one or more processors, and a non-transitory memory:
   detecting a second device in a field-of-view of the image sensor of the first device, wherein the second device is displaying video content at a first location in the physical environment on a second display;
   detecting a transfer trigger to display the video content at a second location in the physical environment; and
   in response to detecting the transfer trigger, displaying, on the first display of the first device, a transfer animation of the video content being moved from the first location to the second location.

2. The method of claim 1, wherein detecting the transfer trigger includes receiving, from the second device, a transfer request.

3. The method of claim 2, wherein the transfer request is generated in response to a user input.

4. The method of claim 3, wherein the user input includes selection of a device transfer affordance.

5. The method of claim 2, wherein the transfer request is generated in response to a determination that the second device is inferior to present the video content.

6. The method of claim 1, wherein detecting the transfer trigger includes detecting a user input.

7. The method of claim 1, wherein detecting the transfer trigger includes detecting that a gaze of the user is at the second location.

8. The method of claim 1, wherein detecting the transfer trigger includes detecting motion of the second device towards the first device.

9. The method of claim 1, wherein displaying the transfer animation includes determining a relative pose in the physical environment of the first device and the second device.

10. The method of claim 9, wherein determining the relative pose includes receiving, from the second device, relative pose information.

11. The method of claim 9, wherein determining the relative pose includes detecting the second device in an image of the physical environment.

12. The method of claim 1, wherein displaying the transfer animation includes displaying a plurality of frames of the video content.

13. The method of claim 12, wherein the second device displays the video content at the first location at a frame rate and the first device displays the plurality of frames of the video content at the frame rate.

14. The method of claim 1, further comprising transmitting, to the second device, a transfer response to cease display of the video content by the second device.

15. The method of claim 14, wherein the transfer response is sent while the video content is displayed at the first location.

16. The method of claim 1, further comprising:
    detecting a return trigger to return display of the video content to the second device; and
    in response to detecting the return trigger, displaying, on the first display, a return animation of the video content being moved from the second location to a third location.

17. A first device comprising:
    an image sensor;
    a first display;
    a non-transitory memory; and
    one or more processors to:
        detect a second device in a field-of-view of the image sensor of the first device, wherein the second device is displaying video content at a first location in the physical environment on a second display;
        detect a transfer trigger to display the video content at a second location in the physical environment; and
        in response to detecting the transfer trigger, display, on the first display of the first device, a transfer animation of the video content being moved from the first location to the second location.

18. The device of claim 17, wherein the one or more processors are further to transmit, to the second device, a transfer response to cease display of the video content by the second device.

19. The device of claim 18, wherein the transfer response is sent while the video content is displayed at the first location.

20. A non-transitory memory storing one or more programs, which, when executed by one or more processors of a first device including an image sensor and a first display, cause the first device to:
    detect a second device in a field-of-view of the image sensor of the first device, wherein the second device is displaying video content at a first location in the physical environment on a second display;
    detect a transfer trigger to display the video content at a second location in the physical environment; and
    in response to detecting the transfer trigger, display, on the first display of the first device, a transfer animation of the video content being moved from the first location to the second location.

21. The method of claim 1, further comprising displaying, on the first display of the first device, the video content at the first location in the physical environment before displaying the transfer animation of the video content.

* * * * *